(12) United States Patent
Takahashi et al.

(10) Patent No.: US 12,247,093 B2
(45) Date of Patent: Mar. 11, 2025

(54) WATER-REPELLENT COMPOSITION

(71) Applicant: DAIKIN INDUSTRIES, LTD., Osaka (JP)

(72) Inventors: Kanako Takahashi, Osaka (JP); Rumi Kawabe, Osaka (JP); Miharu Ohta, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 798 days.

(21) Appl. No.: 17/395,535

(22) Filed: Aug. 6, 2021

(65) Prior Publication Data

US 2021/0363280 A1    Nov. 25, 2021

Related U.S. Application Data

(63) Continuation of application No. PCT/JP2020/004580, filed on Feb. 6, 2020.

(30) Foreign Application Priority Data

Feb. 8, 2019  (JP) .................................. 2019-021692

(51) Int. Cl.

| C08F 220/58 | (2006.01) |
|---|---|
| C08F 214/06 | (2006.01) |
| C08F 214/08 | (2006.01) |
| C08G 18/10 | (2006.01) |
| C08G 18/38 | (2006.01) |
| C08G 77/20 | (2006.01) |
| D06M 15/248 | (2006.01) |
| D06M 15/263 | (2006.01) |
| D06M 15/285 | (2006.01) |

(52) U.S. Cl.
CPC .......... *C08F 220/58* (2013.01); *C08F 214/06* (2013.01); *C08F 214/08* (2013.01); *C08G 18/10* (2013.01); *C08G 18/3853* (2013.01); *C08G 77/20* (2013.01); *D06M 15/248* (2013.01); *D06M 15/263* (2013.01); *D06M 15/285* (2013.01); *D06M 2200/12* (2013.01)

(58) Field of Classification Search
CPC .......................... C09D 133/14; C08G 18/3853
USPC ....................................................... 524/555
See application file for complete search history.

(56) References Cited

U.S. PATENT DOCUMENTS

| 5,225,480 A * | 7/1993 | Tseng | C08F 220/343 524/812 |
|---|---|---|---|
| 2013/0165006 A1 * | 6/2013 | Yoshino | C08G 18/3206 442/86 |
| 2017/0218151 A1 * | 8/2017 | Hanazawa | B05D 7/588 |
| 2020/0239613 A1 | 7/2020 | Yamamoto et al. | |

FOREIGN PATENT DOCUMENTS

| CN | 107304323 A | 10/2017 |
|---|---|---|
| EP | 3 460 021 A1 | 3/2019 |
| EP | 3 865 524 A1 | 8/2021 |
| JP | 11-310685 A | 11/1999 |
| JP | 2006-328624 A | 12/2006 |
| JP | 6272588 B1 | 1/2018 |
| WO | 2015/076347 A1 | 5/2015 |
| WO | 2015/080026 A1 | 6/2015 |
| WO | 2018/054712 A1 | 3/2018 |
| WO | 2019/026593 A1 | 2/2019 |

OTHER PUBLICATIONS

Sigma-Aldrich Product Specification, Product Name: Poly(ethylene glycol) (12) tridecyl ether, 1 page (undated).*
International Preliminary Report on Patentability (with translation of the Written Opinion) dated Aug. 10, 2021, issued by the International Bureau in application No. PCT/JP2020/004580.

(Continued)

*Primary Examiner* — Fred M Teskin

(74) *Attorney, Agent, or Firm* — Sughrue Mion, PLLC

(57) ABSTRACT

A water-repellent composition containing (1) a polymer having 2-100 wt %, with respect to the polymer, of a repeating unit derived from an amide group-containing monomer (a) represented by the following formula

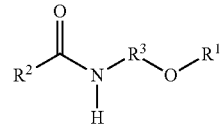

[wherein $R^1$ is an organic moiety having an ethylenically unsaturated polymerizable group, $R^2$ is a $C_{7-30}$ hydrocarbon group, and $R^3$ is a $C_{1-5}$ hydrocarbon group], (2) a co-agent containing at least one co-agent compound selected from the group consisting of a blocked isocyanate compound, a melamine resin, a silicone polymer, a wax, an acetylene-based emulsifier, and a polyoxyalkylene group-containing emulsifier, and (3) a liquid media. Preferably, the water-repellent composition includes no fluoroalkyl group-containing monomer, and preferably no fluorine-containing monomer. Also disclosed is a method for producing the water-repellent composition, a method for treating a substrate with the water-repellent composition, and a method for producing a treated textile product which includes treating a textile product with the water-repellent composition.

15 Claims, No Drawings

(56) References Cited

OTHER PUBLICATIONS

Extended European Search Report dated Oct. 11, 2022 in European Application No. 20752113.9.
International Search Report of PCT/JP2020/004580 dated Mar. 31, 2020.

* cited by examiner

WATER-REPELLENT COMPOSITION

CROSS REFERENCE TO RELATED APPLICATIONS

This application is a Rule 53(b) Continuation of International Application No. PCT/JP2020/004580 filed Feb. 6, 2020, claiming priority based on Japanese Patent Application No. 2019-021692 filed Feb. 8, 2019, the respective disclosures of which are incorporated herein by reference in their entirety.

TECHNICAL FIELD

The present disclosure relates to a water-repellent composition.

BACKGROUND ART

Fluorine-containing water- and oil-repellent agents, which contain fluorine compounds, have been conventionally known. Such a water- and oil-repellent agent exhibits good water- and oil-repellency when substrates such as textile products are treated with the water- and oil-repellent agent.

The results of the latest researches [a report of the Environmental Protection Agency (EPA), "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)] have taught that PFOA (perfluorooctanoic acid), which is one of long-chain fluoroalkyl compounds, is proved to have a danger to burden the environment, and EPA announced on Apr. 14, 2003 that the scientific investigation on PFOA should be more intensively executed.

On the other hand, the Federal Register (FR Vol. 68, No. 73/Apr. 16, 2003[FRL-2303-8], http://www.epa.gov/opptintr/pfoa/pfoafr.pdf), EPA Environmental News FOR RELEASE: MONDAY Apr. 14, 2003 EPA INTENSIFIES SCIENTIFIC INVESTIGATION OF A CHEMICAL PROCESSING AID (http://www.epa.gov/opptintr/pfoa/pfoaprs.pdf), and EPA OPPT FACT SHEET Apr. 14, 2003 (http://www.epa.gov/opptintr/pfoa/pfoafacts.pdf) have published that telomers have a possibility to produce PFOA when decomposed or metabolized (a telomer means a long-chain fluoroalkyl group). They also have published that telomers are used in many products such as foam fire extinguishers, care products, washing materials, carpets, textiles, paper, and leather to which water- and oil-repellency and antifouling property have been imparted. Such fluorine-containing compounds may cause concerns over their accumulation in the environment.

JP2006-328624A discloses a water repellent agent comprising a non-fluorine-based polymer containing a (meth)acrylic ester in which the ester moiety has 12 or more carbon atoms, as a monomer unit, the constituting proportion of the (meth)acrylic ester being 80 to 100% by mass, based on the total amount of the monomer units constituting the non-fluorine-based polymer.

International Publication No. WO 2015/076347 discloses a surface-treating agent comprising a non-fluorine polymer composed of a long-chain (meth)acrylate ester monomer and an amidoamine surfactant, and International Publication No. WO 2015/080026 discloses a surface-treating agent comprising a long-chain (meth)acrylate ester monomer and a (meth)acrylate monomer having a cyclic hydrocarbon group. In these surface-treating agents, no fluoroalkyl group-containing monomer is used.

CITATION LIST

Patent Literature

Patent Literature 1: JP2006-328624A
Patent Literature 2: International Publication No. WO 2015/076347
Patent Literature 3: International Publication No. WO 2015/080026

SUMMARY OF INVENTION

Technical Problem

An object of the present disclosure is to provide a water-repellent composition which imparts excellent water-repellency and includes no fluoroalkyl group-containing monomer, preferably no fluorine-containing monomer.

Solution to Problem

The present disclosure relates to a water-repellent composition comprising:
(1) a polymer having a repeating unit derived from an amide group-containing monomer; and
(2) a combination agent.
The amide group-containing monomer is preferably a compound represented by the formula:

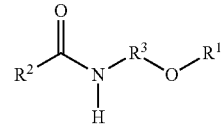

wherein $R^1$ is an organic residue having an ethylenically unsaturated polymerizable group,
$R^2$ is a hydrocarbon group having 7 to 30 carbon atoms, and
$R^3$ is a hydrocarbon group having 1 to 5 carbon atoms.

[1]
A water-repellent composition comprising:
(1) a polymer having a repeating unit derived from (a) an amide group-containing monomer represented by the formula:

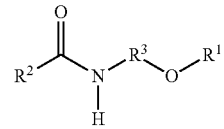

wherein $R^1$ is an organic residue having an ethylenically unsaturated polymerizable group,
$R^2$ is a hydrocarbon group having 7 to 30 carbon atoms, and
$R^3$ is a hydrocarbon group having 1 to 5 carbon atoms,
wherein the amount of the repeating unit is 2 to 100% by weight, based on the amount of the polymer;

(2) a combination agent comprising at least one combination compound selected from the group consisting of a blocked isocyanate compound, a melamine resin, a silicone polymer, a wax, an acetylene-based emulsifier, and a polyoxyalkylene group-containing emulsifier; and
(3) a liquid medium.

[2]

The water-repellent composition according to [1], wherein, in the monomer (a), $R^1$ is $-C(=O)CR^{11}=CH_2$, wherein $R^{11}$ is a hydrogen atom or a methyl group.

[3]

The water-repellent composition according to [1] or [2], wherein
the polymer (1) further has a repeating unit derived from a polymerizable monomer other than the monomer (a), and
the polymerizable monomer other than the monomer (a) is a compound represented by the formula:

$$CH_2=CA-T$$

wherein A is a hydrogen atom, a methyl group, a chlorine atom, a bromine atom, or an iodine atom, and
T is a hydrogen atom, a chlorine atom, a bromine atom, an iodine atom, a chained or cyclic hydrocarbon group having 1 to 40 carbon atoms, or a chained or cyclic organic group having an ester bond and having 2 to 41 carbon atoms.

[4]

The water-repellent composition according to [3], wherein
the polymerizable monomer other than the monomer (a) is at least one selected from the group consisting of:
(b) an acrylate ester monomer;
(c) a fluorine-free crosslinkable monomer; and
(d) a halogenated olefin monomer.

[5]

The water-repellent composition according to [4], wherein
the acrylate ester monomer (b) is at least one selected from the group consisting of:
(b1) an acrylate ester monomer having an aliphatic hydrocarbon group; and
(b2) an acrylate ester monomer having a cyclic hydrocarbon group,
the fluorine-free crosslinkable monomer (c) is a compound having at least two ethylenically unsaturated double bonds or a compound having at least one ethylenically unsaturated double bond and at least one reactive group, and
the halogenated olefin monomer (d) is at least one selected from the group consisting of vinyl chloride and vinylidene chloride.

[6]

The water-repellent composition according to [4] or [5], wherein
in the polymer, the amount of the repeating unit (b) is 0 to 200 parts by weight, the amount of the repeating unit (c) is 0 to 50 parts by weight, and the amount of the repeating unit (d) is 0 to 100 parts by weight, based on 100 parts by weight of the repeating unit (a).

[7]

The water-repellent composition according to any one of [1] to [6], wherein
in the combination agent (2),
the blocked isocyanate compound is a compound having an isocyanate group moiety (a blocked isocyanate group) in which at least one isocyanate group is blocked with a blocking agent and having no polymerizable unsaturated group,
the melamine resin is a polycondensate of melamine and aldehyde,
the silicone polymer is a polymer represented by the formula:

$$(R^{23})_3Si-O-[-Si(R^{21})_2-O-]_a-[-Si(R^{21})(R^{22})-O-]_b-Si(R^{23})_3$$

wherein each $R^{21}$ independently represents a hydrogen atom, an alkyl group having 1 to 20 carbon atoms, an aryl group having 6 to 20 carbon atoms, or an alkoxy group having 1 to 4 carbon atoms,
each $R^{22}$ independently represents a saturated hydrocarbon group having 23 to 40 carbon atoms,
each $R^{23}$ independently represents a hydrogen atom, an alkyl group having 1 to 20 carbon atoms, an aryl group having 6 to 20 carbon atoms, an alkoxy group having 1 to 4 carbon atoms, or a saturated hydrocarbon group having 23 to 40 carbon atoms,
a represents an integer of 0 or more, b represents an integer of 1 or more, and (a+b) is 5 to 200,
in the wax, a compound constituting the wax has 20 to 60 carbon atoms,
the acetylene-based emulsifier is an alcohol having unsaturated triple bond or an alkylene oxide adduct of this alcohol, and
the polyoxyalkylene group-containing emulsifier is a nonionic surfactant in which an alkylene group in an oxyalkylene group has 2 to 10 carbon atoms, and a molecule of the polyoxyalkylene group-containing emulsifier has 2 to 100 oxyalkylene groups.

[8]

The water-repellent composition according to [7], wherein
the blocked isocyanate compound is a reaction product of an isocyanate represented by $A(NCO)_m$, wherein A is a group remaining after isocyanate groups are removed from a polyisocyanate, and m is an integer of 2 to 8, and a blocking agent represented by RH, wherein R is optionally a hydrocarbon group optionally substituted by a hetero atom such as a nitrogen atom or an oxygen atom, and H is a hydrogen atom,
the melamine resin is a partially or fully methylolated melamine resin obtained by a reaction between melamine and an aldehyde,
the silicone polymer is a compound represented by the formula:

$$(CH_3)_3SiO(SiO)_a(SiO)_b-Si(CH_3)_3$$
with side groups $CH_3, CH_3$ on one and $CH_3, (CH_2)_3-(CH_2)_n-CH_3$ on the other wherein a represents an integer of 0 to 150,
b represents an integer of 1 to 150,
(a+b) is 5 to 200, and
n is an integer of 19 to 36,
the wax is constituted by at least one compound selected from the group consisting of a normal alkane having 20 to 60 carbon atoms and a normal alkene having 20 to 60 carbon atoms, in the acetylene-based emulsifier, an acetylene alcohol compound is a compound represented by the formula:

HO—CR$^{31}$R$^{32}$—C≡C—CR$^{33}$R$^{34}$—OH, or

HO—CR$^{35}$R$^{36}$—C≡C—H wherein R$^{31}$, R$^{32}$, R$^{33}$, R$^{34}$, R$^{35}$, and R$^{36}$ are each independently the same or different, and are a hydrogen atom or an alkyl group having 1 to 30 carbon atoms, and the polyoxyalkylene group-containing emulsifier is a condensation product of ethylene oxide, and hexyl phenol, isooctyl phenol, hexadecanol, oleic acid, an alkane ($C_{12}$-$C_{16}$) thiol, a sorbitan monofatty acid ($C_7$-$C_{19}$) or an alkyl ($C_{12}$-$C_{18}$) amine.

[9]
The water-repellent composition according to any one of [1] to [8], wherein the liquid medium (3) is water, an organic solvent, or a mixture of water and an organic solvent.

[10]
The water-repellent composition according to any one of [1] to [9], being an external treatment agent or an internal treatment agent.

[11]
A method for producing the water-repellent composition according to any one of [1] to [10], comprising mixing a polymer mixture which comprises the polymer (1) and the liquid medium (3) with the combination agent (2) comprising a combination compound.

[12]
A method for treating a substrate, comprising treating a substrate with the water-repellent composition according to any one of [1] to [10].

[13]
A method for producing a treated textile product, comprising treating a textile product with the water-repellent composition according to any one of [1] to [10].

The combination agent (2) preferably contains a blocked isocyanate compound.

In other words, the water-repellent composition may comprise:
(1) a polymer having a repeating unit derived from (a) an amide group-containing monomer represented by the formula:

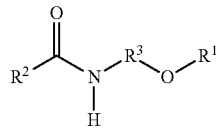

wherein R$^1$ is an organic residue having an ethylenically unsaturated polymerizable group,
R$^2$ is a hydrocarbon group having 7 to 30 carbon atoms, and
R$^3$ is a hydrocarbon group having 1 to 5 carbon atoms, wherein the amount of the repeating unit is 2 to 100% by weight, based on the amount of the polymer;
(2) a blocked isocyanate compound; and
(3) a liquid medium.

In the blocked isocyanate compound, the isocyanate compound is preferably diphenylmethane diisocyanate (MDI) and/or tolylene diisocyanate (TDI), particularly preferably diphenylmethane diisocyanate (MDI).

Advantageous Effects of Invention

The water-repellent composition of the present disclosure includes no fluoroalkyl group-containing monomer, and thus may cause no concerns over accumulation of fluorine-containing compounds in the environment. The water-repellent composition of the present disclosure imparts excellent water-repellency to a substrate.

The water-repellent composition of the present disclosure has good stability (stability of an emulsion). The water-repellent composition of the present disclosure is excellent in durability (particularly, washing durability) of water- and oil-repellency (particularly, water-repellency). The water-repellent composition of the present disclosure is further excellent in processing stability on water repellent treatment.

DESCRIPTION OF EMBODIMENT

The water-repellent composition comprises (1) a water-repellent polymer, (2) a combination agent, and (3) a liquid medium. The water-repellent composition may further contain (4) a surfactant.

(1) Water-Repellent Polymer (or "Polymer")

The water-repellent polymer is a polymer having no fluoroalkyl group. The water-repellent polymer is preferably a fluorine-free polymer having no fluorine atom.

The water-repellent polymer has
(a) a repeating unit derived from an amide group-containing monomer.

The water-repellent polymer may further have a repeating unit derived from a polymerizable monomer other than the amide group-containing monomer (a), preferably a fluorine-free polymerizable monomer other than the monomer (a).

The polymerizable monomer other than the monomer (a) may be a fluorine-free non-crosslinkable monomer or a fluorine-free crosslinkable monomer.

The fluorine-free non-crosslinkable monomer may be a compound represented by the formula:

CH$_2$=CA-T wherein A is a hydrogen atom, a methyl group, or a halogen atom other than a fluorine atom (e.g., a chlorine atom, a bromine atom, and an iodine atom), and
T is a hydrogen atom, a halogen atom other than a fluorine atom (e.g., a chlorine atom, a bromine atom, and an iodine atom), a chained or cyclic hydrocarbon group having 1 to 40 carbon atoms, or a chained or cyclic organic group having an ester bond and having 2 to 41 carbon atoms.

Examples of the chained or cyclic hydrocarbon group having 1 to 40 carbon atoms include linear or branched saturated or unsaturated (e.g., ethylenically unsaturated) aliphatic hydrocarbon groups having 1 to 40 carbon atoms, saturated or unsaturated (e.g., ethylenically unsaturated) cycloaliphatic groups having 4 to 40 carbon atoms, aromatic hydrocarbon groups having 6 to 40 carbon atoms, and aromatic-aliphatic hydrocarbon groups having 7 to 40 carbon atoms.

Examples of the chained or cyclic organic group having an ester bond and having 2 to 41 carbon atoms include —C(=O)—O-Q and —O—C(=O)-Q, wherein Q is a linear or branched saturated or unsaturated (e.g., ethylenically unsaturated) aliphatic hydrocarbon group having 1 to 40 carbon atoms, a saturated or unsaturated (e.g., ethylenically unsaturated) cycloaliphatic groups having 4 to 40 carbon atoms, an aromatic hydrocarbon group having 6 to 40 carbon atoms, or an aromatic-aliphatic hydrocarbon group having 7 to 40 carbon atoms.

The fluorine-free crosslinkable monomer is as described below.

Examples of the polymerizable monomer other than the monomer (a) include the following:
- (b) an acrylate ester monomer;
- (c) a fluorine-free crosslinkable monomer; and
- (d) a halogenated olefin monomer.

The water-repellent polymer may have a fluorine atom but preferably has no fluorine atom. In other words, the water-repellent polymer is preferably a fluorine-free polymer, and all the monomers are preferably fluorine-free monomers.

(a) Amide Group-Containing Monomer

The amide group-containing monomer is a compound represented by the formula:

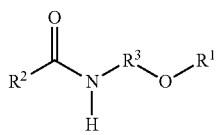

wherein $R^1$ is an organic residue having an ethylenically unsaturated polymerizable group,
$R^2$ is a hydrocarbon group having 7 to 30 carbon atoms, and
$R^3$ is a hydrocarbon group having 1 to 5 carbon atoms.

The amide group-containing monomer has no fluoroalkyl group.

$R^1$ is an organic residue having an ethylenically unsaturated polymerizable group, and is not limited as long as having a double bond between carbons. Specific examples thereof include organic residues having an ethylenically unsaturated polymerizable group such as —C(=O)CR$^{11}$=CH$_2$, —CHR$^{11}$=CH$_2$, and —CH$_2$CHR$^{11}$=CH$_2$, and examples of $R^{11}$ include a hydrogen atom or an alkyl group having 1 to 4 carbon atoms. $R^1$ may also have various organic groups other than an ethylenically unsaturated polymerizable group, and examples thereof include organic groups such as chained hydrocarbons, cyclic hydrocarbons, polyoxyalkylene groups, and polysiloxane groups. These organic groups may be substituted by various substituents. $R^1$ is preferably —C(=O)CR$^{11}$=CH$^2$.

$R^2$ is a hydrocarbon group having 7 to 30 carbon atoms, and examples thereof include chained hydrocarbons and cyclic hydrocarbons. Among them, $R^2$ is preferably a chained hydrocarbon, particularly preferably a linear saturated hydrocarbon group. $R^2$ has 7 to 30 carbon atoms, preferably 11 to 27 carbon atoms, particularly preferably 15 to 23 carbon atoms.

$R^3$ is a hydrocarbon group having 1 to 5 carbon atoms. The hydrocarbon group having 1 to 5 carbon atoms may be either linear or branched and may include an unsaturated bond, but is preferably linear. $R^3$ has preferably 2 to 4 carbon atoms, particularly preferably 2 carbon atoms. $R^3$ is preferably an alkylene group.

The amide group-containing monomer may be a monomer wherein $R^2$ is a single type (e.g., only a compound wherein $R^2$ has 17 carbon atoms), or a monomer wherein a plurality of $R^2$ are combined (e.g., a mixture of a compound wherein $R^2$ has 17 carbon atoms and a compound wherein $R^2$ has 15 carbon atoms).

Examples of the amide group-containing monomer include palmitic acid amide ethyl (meth)acrylate, stearic acid amide ethyl (meth)acrylate, behenic acid amide ethyl (meth)acrylate, myristic acid amide ethyl (meth)acrylate, lauric acid amide ethyl (meth)acrylate, isostearic acid ethylamide (meth)acrylate, oleic acid ethylamide (meth)acrylate, tert-butylcyclohexyl caproic acid amide ethyl (meth)acrylate, adamantanecarboxylic acid ethylamide (meth)acrylate, naphthalenecarboxylic acid amide ethyl (meth)acrylate, anthracenecarboxylic acid amide ethyl (meth)acrylate, palmitic acid amide propyl (meth)acrylate, stearic acid amide propyl (meth)acrylate, palmitic acid amide ethyl vinyl ether, stearic acid amide ethyl vinyl ether, palmitic acid amide ethyl allyl ether, stearic acid amide ethyl allyl ether, and a mixture thereof.

The amide group-containing monomer is preferably stearic acid amide ethyl (meth)acrylate. The amide group-containing monomer may be a mixture containing stearic acid amide ethyl (meth)acrylate. The amount of stearic acid amide ethyl (meth)acrylate in the mixture containing stearic acid amide ethyl (meth)acrylate may be, for example, 55 to 99% by weight, preferably 60 to 85% by weight, further preferably 65 to 80% by weight, based on the total weight of the amide group-containing monomer. The rest of the monomers may be, for example, palmitic acid amide ethyl (meth)acrylate.

(b) Acrylate Ester Monomer

The water-repellent polymer may have a repeating unit derived from another acrylate ester monomer.

Examples of the other acrylate ester monomer are as follows:
- (b1) an acrylate ester monomer having an aliphatic hydrocarbon group; and
- (b2) an acrylate ester monomer having a cyclic hydrocarbon group.

The water-repellent polymer may have a repeating unit derived from at least one monomer selected from the group consisting of the monomer (b1) and the monomer (b2).

(b1) Acrylate Ester Monomer Having an Aliphatic Hydrocarbon Group

The water-repellent polymer may have a repeating unit derived from an acrylate ester monomer containing an aliphatic hydrocarbon group. The acrylate ester monomer containing an aliphatic hydrocarbon group is a (meth)acrylate ester (i.e., acrylate or methacrylate).

A preferred example of the acrylate ester monomer containing an aliphatic hydrocarbon group is a compound represented by the formula:

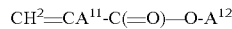

wherein $A^{11}$ is a hydrogen atom or a methyl group, and
$A^{12}$ is a linear or branched aliphatic hydrocarbon group having 1 to 40 carbon atoms.

The acrylate ester monomer containing an aliphatic hydrocarbon group has no fluoroalkyl group. The acrylate ester monomer containing an aliphatic hydrocarbon group may contain a fluorine atom but preferably contains no fluorine atom.

$A^{12}$ is a linear or branched hydrocarbon group. The linear or branched hydrocarbon group may be particularly a linear hydrocarbon group. The linear or branched hydrocarbon group has 1 to 40, for example, 10 to 40, preferably 18 to 40 carbon atoms. The linear or branched hydrocarbon group has preferably 18 to 28, particularly 18 or 22 carbon atoms, and is generally a saturated aliphatic hydrocarbon group, particularly an alkyl group.

Specific examples of the acrylate ester monomer containing an aliphatic hydrocarbon group include lauryl (meth)acrylate, cetyl (meth)acrylate, stearyl (meth)acrylate, and behenyl (meth)acrylate.

The presence of the acrylate ester containing an aliphatic hydrocarbon group provides softer texture.

(b2) Acrylate Ester Monomer Containing a Cyclic Hydrocarbon Group.

The water-repellent polymer may have a repeating unit derived from an acrylate ester monomer containing a cyclic hydrocarbon group.

The acrylate ester monomer containing a cyclic hydrocarbon group is preferably a compound represented by the formula:

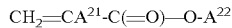

$$CH_2=CA^{21}\text{-}C(=O)\text{—}O\text{-}A^{22}$$

wherein $A^{21}$ is a hydrogen atom, a methyl group, a halogen, a linear or branched alkyl group having 2 to 21 carbon atoms, a $CFX^1X^2$ group (provided that $X^1$ and $X^2$ are each a hydrogen atom, a fluorine atom, a chlorine atom, a bromine atom, or an iodine atom), a cyano group, a linear or branched fluoroalkyl group having 1 to 21 carbon atoms, a substituted or non-substituted benzyl group, or a substituted or non-substituted phenyl group, and $A^{22}$ is a group containing a cyclic hydrocarbon group having 4 to 40 carbon atoms.

The acrylate ester monomer containing a cyclic hydrocarbon group is preferably a monomer whose homopolymer has a high glass transition temperature (for example, 50° C. or more, in particular, 80° C. or more).

The acrylate ester monomer containing a cyclic hydrocarbon group has no fluoroalkyl group. The acrylate ester monomer containing a cyclic hydrocarbon group may contain a fluorine atom but preferably contains no fluorine atom.

Examples of $A^{21}$ include a hydrogen atom, a methyl group, Cl, Br, I, F, CN, and $CF_3$. $A^{21}$ is preferably a chlorine atom.

$A^{22}$ is a cyclic hydrocarbon group which may have a chained group (e.g., a linear or branched hydrocarbon group). Examples of the cyclic hydrocarbon group include a saturated or unsaturated monocyclic group, polycyclic group, and bridged ring group. The cyclic hydrocarbon group is preferably saturated. The cyclic hydrocarbon group has 4 to 40, preferably 6 to 20 carbon atoms.

Examples of the cyclic hydrocarbon group include a cycloaliphatic group having 4 to 20, particularly 5 to 12 carbon atoms, an aromatic group having 6 to 20 carbon atoms, and an aromatic aliphatic group having 7 to 20 carbon atoms. The cyclic hydrocarbon group has 15 or less, particularly preferably 12 or less carbon atoms, for example. The cyclic hydrocarbon group is preferably a saturated cycloaliphatic group. Specific examples of the cyclic hydrocarbon group include a cyclohexyl group, a t-butylcyclohexyl group, an isobornyl group, a dicyclopentanyl group, and a dicyclopentenyl group.

Specific examples of the acrylate ester monomer containing a cyclic hydrocarbon group include cyclohexyl acrylate, t-butylcyclohexyl acrylate, benzyl acrylate, isobornyl acrylate, dicyclopentanyl acrylate, dicyclopentenyl acrylate; and cyclohexyl methacrylate, t-butylcyclohexyl methacrylate, benzyl methacrylate, isobornyl methacrylate, dicyclopentanyl methacrylate, and dicyclopentenyl methacrylate.

The presence of the acrylate ester monomer containing a cyclic hydrocarbon group may improve processing stability and enhance water-repellency.

(c) Fluorine-Free Crosslinkable Monomer

The water-repellent polymer may have a repeating unit derived from a fluorine-free crosslinkable monomer.

The fluorine-free crosslinkable monomer is a monomer containing no fluorine atom. The fluorine-free crosslinkable monomer may be a compound having at least two reactive groups and/or ethylenically unsaturated carbon-carbon double bonds (preferably, a (meth)acrylate group) and having no fluorine. The fluorine-free crosslinkable monomer may be a compound having at least two ethylenically unsaturated carbon-carbon double bonds (preferably, a (meth)acrylate group), or a compound having at least one ethylenically unsaturated carbon-carbon double bond and at least one reactive group. Examples of the reactive group include a hydroxyl group, an epoxy group, a chloromethyl group, a blocked isocyanate group, an amino group, and a carboxyl group.

The fluorine-free crosslinkable monomer may be mono(meth)acrylate, di(meth)acrylate, or mono(meth)acrylamide having a reactive group. Alternatively, the fluorine-free crosslinkable monomer may be di(meth)acrylate.

An example of the fluorine-free crosslinkable monomer is a vinyl monomer having a hydroxyl group.

Examples of the fluorine-free crosslinkable monomer include, but are not limited to, diacetone (meth)acrylamide, N-methylol (meth)acrylamide, hydroxyethyl (meth)acrylamide, hydroxymethyl (meth)acrylate, hydroxyethyl (meth)acrylate, 2,3-dihydroxypropyl (meth)acrylate, 3-chloro-2-hydroxypropyl (meth)acrylate, 2-acetoacetoxy ethyl (meth)acrylate, butadiene, isoprene, chloroprene, vinyl monochloroacetate, vinyl methacrylate, glycidyl (meth)acrylate, 1,4-butanediol di(meth)acrylate, 1,6-hexanediol di(meth)acrylate, 1,9-nonanediol di(meth)acrylate, and neopentyl glycol di(meth)acrylate.

The presence of the fluorine-free crosslinkable monomer improves washing durability provided by the water-repellent polymer.

(d) Halogenated Olefin Monomer

The water-repellent polymer may have a repeating unit derived from a halogenated olefin monomer.

The halogenated olefin monomer preferably has no fluorine atom.

The halogenated olefin monomer is preferably an olefin having 2 to 20 carbon atoms which is substituted by 1 to 10 chlorine atoms, bromine atoms, or iodine atoms. Preferably, the halogenated olefin monomer is a chlorinated olefin having 2 to 20 carbon atoms, particularly an olefin having 2 to 5 carbon atoms and having 1 to 5 chlorine atoms. Preferred examples of the halogenated olefin monomer include halogenated vinyl such as vinyl chloride, vinyl bromide, and vinyl iodide, and halogenated vinylidene such as vinylidene chloride, vinylidene bromide, and vinylidene iodide. Vinyl chloride is preferred because water-repellency, particularly durability of water-repellency, is enhanced.

The presence of a repeating unit derived from the halogenated olefin monomer enhances washing durability provided by the water-repellent polymer.

(e) Another Monomer

Another monomer (e) other than the monomers (a) to (d), for example, a fluorine-free non-crosslinkable monomer, also may be used.

Examples of the other monomer include ethylene, vinyl acetate, acrylonitrile, styrene, polyethylene glycol (meth)acrylate, polypropylene glycol (meth)acrylate, methoxypolyethylene glycol (meth)acrylate, methoxypolypropylene glycol (meth)acrylate, and vinyl alkyl ether. Another monomer is not limited to these examples.

In the present description, "(meth)acrylate" means acrylate or methacrylate, and "(meth)acrylamide" means acrylamide or methacrylamide.

Each of the monomers (a) to (e) may be a single type or a mixture of two or more.

The amount of the monomer (a) is 2 to 100% by weight, based on the amount of the water-repellent polymer. The lower limit of the amount of the monomer (a) may be 3% by weight, for example, 5% by weight, particularly 10% by weight, especially 15% by weight, based on the amount of the water-repellent polymer. Alternatively, the lower limit of the amount of the monomer (a) may be 20% by weight, for example, 25% by weight, particularly 30% by weight, especially 40% by weight or 50% by weight, based on the amount of the water-repellent polymer. The upper limit of the amount of the monomer (a) may be 95% by weight, for example, 80% by weight, 75% by weight, or 70% by weight, based on the amount of the water-repellent polymer.

In the water-repellent polymer,
the amount of the repeating unit (b) may be 0 to 2,000 parts by weight, preferably 0 to 200 parts by weight, more preferably 1 to 100 parts by weight, for example, 5 to 80 parts by weight,
the amount of the repeating unit (c) may be 0 to 50 parts by weight, preferably 1 to 10 parts by weight, for example, 2 to 8 parts by weight,
the amount of the repeating unit (d) may be 0 to 100 parts by weight, preferably 1 to 60 parts by weight, for example, 2 to 10 parts by weight, and
the amount of the repeating unit (e) may be 0 to 100 parts by weight, preferably 1 to 30 parts by weight, for example, 2 to 10 parts by weight, based on 100 parts by weight of the monomer (a).

In the water-repellent polymer, the amount of each of the monomer (b1) and the monomer (b2) may be 0 to 150 parts by weight, preferably 1 to 100 parts by weight, for example, 2 to 50, based on 100 parts by weight of the monomer (a).

Alternatively, as for the amount of the monomer (b), monomer (c), monomer (d), and monomer (e), (b):(c):(d):(e) may be 0 to 80% by weight:0 to 10% by weight:0 to 40% by weight:0 to 20% by weight, for example, 3 to 75% by weight:0.5 to 5% by weight:2 to 30% by weight:0 to 10% by weight, particularly 10 to 70% by weight:0.8 to 3% by weight:5 to 25% by weight:0 to 5% by weight, based on the amount of the water-repellent polymer.

The number average molecule weight (Mn) of the water-repellent polymer may be generally 1,000 to 1,000,000, for example, 5,000 to 500,000, particularly 3,000 to 200,000. The number average molecule weight (Mn) of the water-repellent polymer is generally measured by GPC (gel permeation chromatography).

In the present disclosure, monomers are polymerized to give a water-repellent composition in which polymer is dispersed or dissolved in a liquid medium.

The monomers used in the present disclosure are as follows:
monomer (a),
monomers (a)+(b),
monomers (a)+(b)+(c),
monomers (a)+(b)+(d), or
monomers (a)+(b)+(c)+(d).
In addition to the above, the monomer (e) may be used. The monomer (b) may be at least one of the monomer (b1) and the monomer (b2).

(2) Combination Agent

The combination agent comprises at least one combination compound (active component of the combination agent) selected from the group consisting of a blocked isocyanate compound, a melamine resin, a silicone polymer, a wax, an acetylene-based emulsifier, and a polyoxyalkylene group-containing emulsifier. The combination agent may consist of the combination compound or may comprise the combination compound and a liquid medium. The combination agent preferably comprises a blocked isocyanate compound.

(2-1) Blocked Isocyanate Compound

The blocked isocyanate compound is blocked with at least one blocking agent. The blocked isocyanate compound is a reaction product of an isocyanate and at least one blocking agent.

The blocked isocyanate compound is a compound having the isocyanate group moiety (blocked isocyanate group) of isocyanate (monoisocyanate or polyisocyanate) wherein at least one isocyanate group is blocked with a blocking agent, and the compound has no polymerizable unsaturated group. The blocked isocyanate compound may be modified with a compound having a hydrophilic group.

Examples of the hydrophilic group include:
a nonionic hydrophilic group (e.g., a hydroxyl group, an amino group, and a polyoxyalkylene group (particularly a polyoxyethylene group); and
an ionic (cationic or anionic) hydrophilic group (e.g., a carboxyl group, a sulfate group, a sulfonic group, a sulfonate group and a sulfite group).

The isocyanate (preferably polyisocyanate) may be an aliphatic, alicyclic, or aromatic-aliphatic isocyanate. The isocyanate may be, for example, tolylene diisocyanate (TDI), diphenylmethane diisocyanate (MDI), a MDI oligomer, naphthalene-1,5-diisocyanate, xylylene diisocyanate, hexamethylene diisocyanate (HDI), 4,4-dicyclohexylmethane diisocyanate, norbornane diisocyanate, isophorone diisocyanate (IPDI), an adduct (e.g., a TMP (trimethylol propane) adduct of TDI or HDI), an allophanate modified product, a biuret modified product (e.g., a biuret produced from HDI), an isocyanurate modified product (e.g., an isocyanurate produced from TDI, an isocyanurate produced from HDI, an isocyanurate produced from IPDI, and an isocyanurate produced from TDI and HDI) or a carbodiimide modified product of the foregoing compounds, or a urethane prepolymer.

Examples of the blocking agent include an oxime, a phenol, an alcohol, a mercaptan, an amide, an imide, an imidazole, a urea, an amine, an imine, a pyrazole, and an active methylene compound. Other examples of the blocking agent include a pyridinol, a thiophenol, a diketone, and an ester. The blocked isocyanate compound may be modified with a compound having a hydrophilic group.

Examples of the oxime include formamidoxime, acetaldoxime, acetoxime, methyl ethyl ketoxime, and cyclohexanone oxime.

Examples of the phenol include phenols which may have at least one (preferably 1 or 2) $C_{1-10}$ alkyl group. Specific examples of the phenol include phenol, monoalkylphenol (e.g., cresol, ethylphenol, propylphenol, butylphenol, hexylphenol, 2-ethylhexylphenol, and octylphenol), and dialkylphenol (e.g., diethylphenol, dipropylphenol, dipropylcresol, dibutylphenol, di-2-ethylhexylphenol, dioctylphenol, and dinonylphenol).

Specific examples of the phenol include styrenated phenol and hydroxyl benzoate ester.

Examples of the alcohol include (preferably monohydric) alcohols having a $C_1$-$C_{30}$ alkyl group (particularly alkanol). Specific examples of the alcohol include methanol, ethanol, propanol, 1-butanol, sec-butanol, 2-ethyl-1-hexanol, 2-methoxyethanol, 2-butoxyethanol, 2-methoxy-1-propanol, and 3-methyl-2-penten-4-yn-1-ol.

Examples of the mercaptan include butyl mercaptan and dodecyl mercaptan.

Specific examples of the amide (preferably acid amide) include acetanilide, acetamide, β-propiolactam, γ-butyrolactam, δ-valerolactam, ε-caprolactam, laurolactam, stearolactam, N-methyl-ε-caprolactam, and pyrrolidinone.

Specific examples of the imide include acid imide, such as succinimide and maleimide.

Specific examples of the imidazole include imidazole and 2-methylimidazole.

Specific examples of the urea include urea, thiourea, and ethylene urea.

Specific examples of the amine include diphenylamine, aniline, carbazole, diethylamine, dipropylamine, and propylethylamine.

Specific examples of the imine include ethyleneimine and polyethyleneimine.

Specific examples of the pyrazole compound include, 2-methyl-pyrazole, 3-methyl-pyrazole, 4-methyl-pyrazole, 2,4-dimethyl-pyrazole, 2,5-dimethyl-pyrazole, 3,4-dimethyl-pyrazole, 3,5-dimethyl-pyrazole, 4-nitro-3,5-dimethyl-pyrazole, and 4-bromo-3,5-dimethyl-pyrazole.

Examples of the active methylene compound include a malonate ester (e.g., a $C_{1\text{-}30}$ alkyl malonate, an acetoacetic ester (e.g., a $C_{1\text{-}30}$ alkyl acetoacetate), and acetyl acetone).

The blocked isocyanate compound may be modified with a compound having a hydrophilic group. The compound having a hydrophilic group may be a compound having a nonionic hydrophilic group or a compound having an ionic hydrophilic group. Alternatively, the compound having a hydrophilic group may be resulting from the reaction between a compound having a nonionic hydrophilic group or a compound having an ionic hydrophilic group and an isocyanate, usually, a reaction between active hydrogen (e.g., —OH or —$NH_2$) and an isocyanate group (—NCO). Each of the compound having a nonionic hydrophilic group and the compound having an ionic hydrophilic group preferably has a number average molecular weight of 100 to 4,000, particularly 200 to 2,000. The compound having a nonionic hydrophilic group is particularly preferable. The compound having a nonionic hydrophilic group is preferably a compound having an active hydrogen atom at one end and polyethylene oxide chain. The compound having a nonionic hydrophilic group can be prepared by addition-reacting an alkylene oxide, particularly ethylene oxide to a monoalcohol (e.g., having 1 to 30 carbon atoms) such as methanol. Here, the amount of ethylene oxide is preferably at least 50% by weight, based on the amount of the alkylene oxide (the upper limit of the amount of ethylene oxide is 100% by weight, for example, 90% by weight, based on the amount of the alkylene oxide). The compound having a nonionic hydrophilic group may contain a propylene oxide unit in the amount of 0 to 50% by weight, for example, 0 to 20% by weight, particularly 1 to 10% by weight, based on the amount of the alkylene oxide. The compound having an ionic hydrophilic group is preferably an anionic compound (e.g., a hydroxycarboxylic acid, an amino acid, an aminosulfonic acid, and hydroxysulfonic acid). A cationic compound such as a tertiary amino compound having a hydroxy group, such as dimethylamino propanol, can be used as the compound having an ionic hydrophilic group. The tertiary amino compound having a hydroxy group may be reacted with the isocyanate group and then neutralized with an acid or reacted with a quaternizing agent such as benzyl chloride to give a quaternized salt.

Examples of the compound having a hydrophilic group include a mono- to tetra-hydric alcohol having a (for example, $C_1$-$C_{30}$) aliphatic group, and a (for example, $C_3$-$C_{200}$) monohydric alcohol having at least one oxalkylene group, prepared by adding an (e.g., $C_2$-$C_5$) alkylene oxide to a (e.g., $C_1$-$C_{30}$) monohydric alcohol. Specific examples of the compound having a hydrophilic group include a compound represented by the formula:

R—(O—CH$_2$CH$_2$)$_n$—OH wherein R is $C_1$-$C_{10}$ aliphatic (or alkyl) group (e.g., $CH_3$, $C_2H_5$, $C_3H_7$, $C_4H_9$), and
n is 2 to 50, preferably 5 to 25.

The blocked isocyanate compound can be prepared by reacting
an isocyanate [which may be A(NCO)$_m$, wherein A is a group remaining after isocyanate groups are removed from a polyisocyanate, and m is an integer of 2 to 8)] with
the blocking agent [which may be RH, wherein R is optionally a hydrocarbon group optionally substituted by a hetero atom such as a nitrogen atom or an oxygen atom, and H is a hydrogen atom].

Examples of A include the above specific polyisocyanate such as tolylene diisocyanate (TDI).

Example of R include a group remaining after a hydrogen atom (active hydrogen) is removed from at least one compound selected from the group consisting of an oxime, a phenol, an alcohol, a mercaptan, an amide, an imide, an imidazole, a urea, an amine, an imine, a pyrazole, and an active methylene compound.

Alternatively, the blocked isocyanate compound may be a compound represented by the formula:

$A^1[-W^1-A^2]_d[-V^1-A^3(-V^2)_g]_e$ wherein d represents an integer of 2 or more, e represents an integer of 1 or more, (d+e) is 3 to 6, g represents an integer of 1 or more, $A^1$ represents (d+e)-valent organic group, $W^1$ represents a divalent group which is an ester group, an amide group, a urethane group, or a urea group, $A^2$ represents a linear or branched monovalent hydrocarbon group having 10 to 24 carbon atoms, $V^1$ represents a divalent group which is a urethane group or a urea group, $A^3$ represents a (1+g)-valent organic group, and $V^2$ represents a monovalent group which is an isocyanate group or a blocked isocyanate group.

$A^1$ is preferably a branched alkyl group having 1 to 30, for example, 2 to 15, particularly 4 to 12 carbon atoms.

$A^1$ may be a residue obtained by, from a polyfunctional compound having (d+e) functional groups of one type selected from the group consisting of a hydroxy group, an amino group, and a carboxy group, removing the (d+e) functional groups. Examples of the polyfunctional compound include trimethylolpropane, ditrimethylolpropane, pentaerythritol, dipentaerythritol, sorbitol, and glycerin. Among these, trimethylolpropane and ditrimethylolpropane are preferred.

$W^1$ is an ester group, an amide group, a urethane group, or a urea group. $W^1$ is preferably an ester group or a urethane group.

$A^2$ represents a linear or branched monovalent hydrocarbon group having 10 to 24 carbon atoms. The hydrocarbon group may be a saturated hydrocarbon group or may be an unsaturated hydrocarbon group and may further have alicyclic or aromatic cyclic. The hydrocarbon group is preferably a linear hydrocarbon group, more preferably a linear alkyl group because the water-repellency will be more excellent. The hydrocarbon group has preferably 12 to 21, more preferably 12 to 18 carbon atoms. When the number of carbon atoms is within this range, the water-repellency and texture will be particularly excellent. The hydrocarbon group is particularly preferably a linear alkyl group having 12 to 18 carbon atoms.

Examples of $A^2$ include a decyl group, an undecyl group, a dodecyl group (lauryl group), a myristyl group, a pentadecyl group, a cetyl group, a heptadecyl group, a stearyl group, a nonadecyl group, an eicosyl group, a heneicosyl group, and a behenyl group.

$A^2$ may be a residue obtained by, from a reactive hydrocarbon compound having a reactive group which can react with the functional groups possessed by the above polyfunctional compound, removing the reactive group. Examples of the reactive hydrocarbon compound include a higher fatty acid (note that the following carbon atoms include the carbon atoms of the carbonyl group), a higher aliphatic alcohol, a higher aliphatic monoisocyanate, and a higher aliphatic amine having 10 to 24 carbon atoms.

Examples of the higher fatty acid include lauric acid, myristic acid, pentadecylic acid, palmitic acid, heptadecanoic acid, stearic acid, oleic acid, eicosanic acid, and docosanoic acid.

Examples of the higher aliphatic alcohol include lauryl alcohol, tridecyl alcohol, myristyl alcohol, pentadecyl alcohol, cetanol, stearyl alcohol, oleyl alcohol, eicosanol, heneicosanol, and behenyl alcohol.

Examples of the higher aliphatic monoisocyanate include decyl isocyanate, undecyl isocyanate, dodecyl isocyanate, myristyl isocyanate, pentadecyl isocyanate, cetyl isocyanate, stearyl isocyanate, eicosyl isocyanate, and behenyl isocyanate.

Examples of the higher aliphatic amine include decylamine, laurylamine, myristylamine, stearylamine, and behenylamine.

$V^1$ represents a divalent group which is a urethane group or a urea group. $V^1$ is preferably a urethane group from the viewpoint of durable water-repellency.

$A^3$ represents a (1+g)-valent organic group. $A^3$ has preferably 4 to 40, more preferably 6 to 18 carbon atoms, from the viewpoint of water-repellency, durable water-repellency (particularly, washing durability), and water impermeability. $A^3$ is preferably a hexylene group. g is preferably 1 to 5, more preferably 1 to 2, from the viewpoint of water-repellency, durable water-repellency (particularly, washing durability), and water impermeability.

$A^3$ may be a residue obtained by, from a polyisocyanate compound having two or more isocyanate groups, removing the isocyanate groups. Examples of the polyisocyanate compound include diisocyanates such as tolylene diisocyanate, diphenylmethane diisocyanate (MDI), liquid MDI including polyphenyl polymethyl polyisocyanate, crude MDI, hexamethylene diisocyanate, xylylene diisocyanate, tetramethyl xylylene diisocyanate, hydrogenated diphenylmethane diisocyanate, isophorone diisocyanate, and trimers, each of which are an isocyanurate ring of these. Among these, diphenylmethane diisocyanate (MDI) and tolylene diisocyanate (TDI) are preferred, and diphenylmethane diisocyanate (MDI) is more preferred, from the viewpoint of water-repellency, durable water-repellency (particularly, washing durability), and water impermeability.

$V^2$ represents a monovalent group which is an isocyanate group or a blocked isocyanate group. $V^2$ is preferably a blocked isocyanate group from the viewpoint of the pot life of an isocyanate group. Examples of a blocking agent to block the isocyanate group include an oxime and a pyrazole, as described above.

(2-2) Melamine Resin

A melamine resin is a polycondensate of melamine and aldehyde.

An example of the melamine resin is a partially or fully methylolated melamine resin obtained through reaction of melamine with aldehyde. Examples of the aldehyde include formaldehyde and paraformaldehyde. It is possible to also use a product obtained by further partially or fully etherifying the methylol group of the methylolated melamine resin with alcohol. Examples of the alcohol for use in etherification include methanol, ethanol, n-propanol, isopropanol, n-butanol, isobutanol, 2-ethylbutanol, and 2-ethylhexanol.

(2-3) Silicone Polymer

The silicone polymer is a polymer represented by the formula:

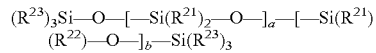

wherein each $R^{21}$ independently represents a hydrogen atom, an alkyl group having 1 to 20 carbon atoms, an aryl group having 6 to 20 carbon atoms, or an alkoxy group having 1 to 4 carbon atoms, each $R^{22}$ independently represents a saturated hydrocarbon group having 23 to 40 carbon atoms, each $R^{23}$ independently represents a hydrogen atom, an alkyl group having 1 to 20 carbon atoms, an aryl group having 6 to 20 carbon atoms, an alkoxy group having 1 to 4 carbon atoms, or a saturated hydrocarbon group having 23 to 40 carbon atoms, a represents an integer of 0 or more, b represents an integer of 1 or more, and (a+b) is 5 to 200.

In $R^{21}$ and $R^{23}$, the alkyl group having 1 to 20 carbon atoms and the aryl group having 6 to 20 carbon atoms may be unsubstituted or substituted.

Specific examples of $R^{21}$ and $R^{23}$ include a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group; a cyclopentyl group, a cyclohexyl group, a cycloheptyl group; a phenyl group, a tolyl group, a naphthyl group, or a group derived from any of the above-mentioned groups by replacing some or all of the hydrogen atoms bonded thereto by halogen atoms, amino groups, cyano groups or the like. $R^{21}$ and $R^{23}$ are each preferably a methyl group or an ethyl group.

$R^{21}$ and $R^{23}$ may have an alkyl group having 3 to 22 carbon atoms or an unsaturated hydrocarbon group (e.g. a hydrocarbon group having an aromatic ring) having 8 to 40 carbon atoms, but preferably have no such a group.

In $R^{21}$ and $R^{23}$, the alkoxy group having 1 to 4 carbon atoms may be linear or branched. Examples of the alkoxy group having 1 to 4 carbon atoms include a methoxy group, an ethoxy group, a propoxy group, and a butoxy group.

In view of easy industrial production and availability, $R^{21}$ and $R^{23}$ are each preferably a hydrogen atom or a methyl group, more preferably a methyl group.

The silicone polymer has at least one saturated hydrocarbon group having 23 to 40 carbon atoms. The saturated hydrocarbon group having 23 to 40 carbon atoms may be linear or branched, and is preferably an alkyl group. Specific examples of the saturated hydrocarbon group having 23 to 40 carbon atoms include a tricosyl group (23 carbon atoms), a lignoceryl group (tetracosyl group, 24 carbon atoms), a cerotyl group (hexacosyl group, 26 carbon atoms), a montyl group (octacosyl group, 28 carbon atoms), a melissyl group (triacontane group, 30 carbon atoms), and a dotriacontane group (32 carbon atoms).

a is an integer of 0 or more. In view of easy industrial production and availability, a is preferably 40 or less, more preferably 30 or less.

The total of a and b is 5 to 200. In view of easy industrial production, availability and easy handling, the total of a and b is preferably 10 to 100, more preferably 40 to 60. a may be 0 to 150, for example 1 to 100. The lower limit of b may be 1, 2 or 3, and the upper limit of b may be 150, 10 or 5.

When a or b is 2 or more, each of $R^{21}$ and $R^{22}$, present in plural, may be the same or different.

Preferably, methyl groups accounts for 50 mol % or more of the total of $R^{21}$, $R^{22}$, and $R^{23}$ groups.

The occurrence order of repeating units within parentheses with subscript a or b is not limited to the occurrence order shown in the chemical formula, and is arbitrary. In other words, the silicone polymer may be a random polymer or a block polymer.

Examples of the silicone polymer include the following:

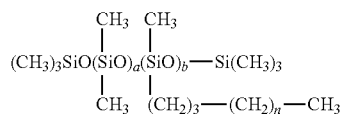

wherein a represents an integer of 0 to 150,
b represents an integer of 1 to 150,
(a+b) is 5 to 200, and
n is an integer of 19 to 36.

(2-4) Wax

Examples of the wax include a paraffin wax, a microcrystalline wax, a Fischer-Tropsch wax, a polyethylene wax, an animal and vegetable wax, and a mineral wax. The paraffin wax is preferable. Specific examples of a compound constituting the wax are normal alkanes (e.g., tricosane, tetracosane, pentacosane, hexacosane, heptacosane, octacosane, nonacosane, triacontane, hentriacontane, dotriacontane, tritriacontane, tetratriacontane, pentatriacontane, and hexatriacontane), normal alkenes (e.g., 1-eicosene, 1-docosene, 1-tricocene, 1-tetracocene, 1-pentacocene, 1-hexacosene, 1-heptacosene, 1-octacosene, nonacosane, triacontane, hentriacontane, dotriacontane, tritriacontane, tetratriacontane, pentatriacontane, and hexatriacontane). The compound constituting the wax has preferably 20 to 60, for example, 25 to 45 carbon atoms. The molecular weight of the wax is preferably 300 to 700.

The melting point of the wax may be 52 to 88° C., preferably 55 to 85° C., more preferably 60 to 80° C., particularly preferably 65 to 78° C.

The needle penetration of the wax is preferably 20 or less, more preferably 15 or less, particularly preferably 10 or less. The lower limit of the needle penetration of the wax may be 0.1, for example, 1.

The melting point and the needle penetration of the wax are measured in accordance with JIS K 2235-1991.

In the water-repellent composition, the weight ratio between the water-repellent polymer and the wax may be 30/70 to 95/5, for example, 40/80 to 90/10.

An aqueous dispersion of the wax can be prepared by dispersing the wax in water in the presence of an emulsifier for wax. The preparation of the aqueous dispersion of wax is preferably carried out by mixing the wax, water and the emulsifier for wax at a high temperature (e.g., 60 to 90° C.). The mixing time may be, for example, 10 seconds to 10 hours. The mixing is carried out preferably by using a homomixer.

Generally, an emulsifier for polymer is used to disperse the water-repellent polymer in the aqueous medium. It is preferable to polymerize the monomer in the presence of the emulsifier for polymer.

Generally, the emulsifier for wax is used to disperse the wax in the aqueous medium.

In the present invention, the emulsifier (the emulsifier for polymer and the emulsifier for wax) may be at least one selected from a nonionic surfactant, a cationic surfactant, an anionic surfactant, and an amphoteric surfactant. The emulsifier is preferably the nonionic surfactant alone or a combination of the nonionic surfactant and the cationic surfactant. In the combination of the nonionic surfactant and the cationic surfactant, the weight ratio of the nonionic surfactant to the cationic surfactant may be 99.5:0.5 to 50:50, for example, 99:1 to 90:10.

The emulsifier for polymer and the emulsifier for wax may be the nonionic surfactant alone or a combination of the nonionic surfactant and the cationic surfactant. One or both of the emulsifier for polymer and the emulsifier for wax comprise a sorbitan ester as the nonionic surfactant. The emulsifier for wax and the emulsifier for polymer are preferably nonionic surfactants. Each of the emulsifier for wax and the emulsifier for polymer is particularly preferably a combination of the sorbitan ester with another emulsifier (particularly, a polyether compound having a polyoxyalkylene group). The hydrophilic-lipophilic balance of the emulsifier for polymer may be 4 to 16, for example, 6 to 15, particularly 8 to 14, especially 8.5 to 13. The hydrophilic-lipophilic balance of the emulsifier for wax may be 4 to 15, for example, 6 to 14, particularly 7 to 13.5, especially 8 to 12.5.

An additional emulsifier which may be added after the step of mixing the aqueous dispersion of the water-repellent polymer with the aqueous dispersion of the wax may be a nonionic surfactant or a cationic surfactant, preferably a nonionic surfactant.

Herein, the hydrophilic-lipophilic balance (HLB) is a value obtained from the following equation by the Griffin method, HLB=20×[(molecular weight of hydrophilic group contained in surfactant)/(molecular weight of surfactant)];

a value described in Document 1 (Surfactant Handbook, 3rd Edition, May 1, 1998); or a value described in Document 2 (The HLB SYSTEM, 1989.7 ICI Americas Inc.).

The HLB numerical value is determined by the Griffin method for a specific surfactant. When the value cannot be calculated by the Griffin method, the numerical value described in Document 1 (or Document 2) is adopted. If the numerical value of HLB is not described in Document 1, the numerical value described in Document 2 is adopted.

In a mixed system containing at least two types of emulsifiers, the HLB of the mixed system can be calculated by a weighted average of the HLB of each single emulsifier.

(2-5) Acetylene-Based Emulsifier

The acetylene-based emulsifier can function as a nonionic surfactant.

The acetylene-based emulsifier is an alcohol having an unsaturated triple bond or an alkylene oxide adduct of this alcohol (both this alcohol and this alkylene oxide adduct are referred to as "acetylene alcohol compounds"). A particularly preferable acetylene-based emulsifier is an alkylene oxide adduct of a monool or polyol having an unsaturated triple bond.

The acetylene alcohol compound is a compound having one or more triple bonds and one or more hydroxyl groups. The acetylene alcohol compound may be a compound including a polyoxyalkylene moiety. Examples of the polyoxyalkylene moiety include polyoxyethylene, polyoxypropylene, a random addition structure of polyoxyethylene and polyoxypropylene, and a block addition structure of polyoxyethylene and polyoxypropylene.

The acetylene alcohol compound may be a compound represented by the formula:

$$HO-CR^{31}R^{32}-C\equiv C-CR^{33}R^{34}-OH, \text{ or}$$

$$HO-CR^{35}R^{36}-C\equiv C-H$$

wherein $R^{31}$, $R^{32}$, $R^{33}$, $R^{34}$, $R^{35}$, and $R^{36}$ are each independently the same or different, and are a hydrogen atom or an alkyl group having 1 to 30 carbon atoms. The acetylene alcohol compound may be an alkylene oxide adduct of the compound represented by this chemical formula. The alkyl group is preferably a linear or branched alkyl group having 1 to 12 carbon atoms, particularly a linear or branched alkyl group having 6 to 12 carbon atoms. Examples of the alkyl group include a methyl group, an ethyl group, a propyl group, a butyl group, and an isobutyl group. The alkylene oxide is preferably an alkylene oxide having 1 to 20 (particularly 2 to 5) carbon atoms, such as ethylene oxide and propylene oxide, and the number of addition of alkylene oxide is preferably 1 to 50.

Specific examples of the acetylene alcohol compound include acetylenediol, propargyl alcohol, 2,5-dimethyl-3-hexyne-2,5-diol, 3,6-dimethyl-4-octyne-3,6-diol, 2,4,7,9-tetramethyl-5-decyne-4,7-diol, 3,5-dimethyl-1-hexyn-3-ol, 3-methyl-1-butyn-3-ol, 3-methyl-1-pentyn-3-ol, 3-hexyne-2,5-diol, and 2-butyne-1,4-diol. Polyethoxylates and ethylene oxide adducts of these specified compounds are also mentioned.

(2-6) Polyoxyalkylene Group-Containing Emulsifier

The polyoxyalkylene group-containing emulsifier is preferably a nonionic surfactant having a polyoxyalkylene group (preferably a polyoxyethylene group). The alkylene group in the oxyalkylene group preferably has 2 to 10 carbon atoms. Preferably, the number of oxyalkylene groups in a molecule of the polyoxyalkylene group-containing emulsifier is generally 2 to 100.

The polyoxyalkylene group-containing emulsifier is preferably a nonionic surfactant having an oxyalkylene group, selected from the group consisting of an ether, an ester, an ester ether, an alkanolamide, a polyhydric alcohol, and an amine oxide.

The polyoxyalkylene group-containing emulsifier may be an alkylene oxide adduct of a linear and/or branched aliphatic (saturated and/or unsaturated) group, a polyalkylene glycol ester of a linear and/or branched fatty acid (saturated and/or unsaturated), a polyoxyethylene (POE)/polyoxypropylene (POP) copolymer (a random copolymer or block copolymer), an alkylene oxide adduct of acetylene glycol, or the like. Among these, preferable are ones in which the structure of the alkylene oxide addition moiety and polyalkylene glycol moiety are polyoxyethylene (POE), polyoxypropylene (POP), or a POE/POP copolymer (which may be a random copolymer or a block copolymer).

The polyoxyalkylene group-containing emulsifier has a structure which does not have an aromatic group in view of environmental problems (such as biodegradability and environmental hormone).

The polyoxyalkylene group-containing emulsifier may be a compound represented by the formula:

$$R^{41}O-(CH_2CH_2O)_p-(R^{42}O)_q-R^{43}$$

wherein $R^{41}$ is an alkyl group having 1 to 22 carbon atoms, or an alkenyl group or an acyl group having 2 to 22 carbon atoms, each $R^{42}$ is independently the same or different, and is an alkylene group having 3 or more (e.g., 3 to 10) carbon atoms, $R^{43}$ is a hydrogen atom, an alkyl group having 1 to 22 carbon atoms, or an alkenyl group having 2 to 22 carbon atoms, p is a number of 2 or more, and q is a number of 0 or 1 or more.

$R^{41}$ preferably has 8 to 20, particularly 10 to 18 carbon atoms. Preferable specific examples of $R^{41}$ include a lauryl group, a tridecyl group, and an oleyl group.

Examples of $R^{42}$ include a propylene group and a butylene group.

In the polyoxyalkylene group-containing emulsifier, p may be a number of 3 or more (e.g., 5 to 200). q may be a number of 2 or more (e.g., 5 to 200). In other words, $-(R^{42}O)_q-$ may form a polyoxyalkylene chain.

The polyoxyalkylene group-containing emulsifier may be a polyoxyethylene alkylene alkyl ether containing a hydrophilic polyoxyethylene chain in the center, and a hydrophobic oxyalkylene chain (particularly a polyoxyalkylene chain). Examples of the hydrophobic oxyalkylene chain include an oxypropylene chain, an oxybutylene chain, and a styrene chain. Particularly, an oxypropylene chain is preferable.

A preferable polyoxyalkylene group-containing emulsifier is a surfactant represented by the formula:

$$R^{41}O-(CH_2CH_2O)_p-H$$

wherein $R^{41}$ and p are the same as defined above.

Specific examples of the polyoxyalkylene group-containing emulsifier include:

$C_{10}H_{21}O-(CH_2CH_2O)_p-(C_3H_6O)_q-H$
$C_{12}H_{25}O-(CH_2CH_2O)_p-(C_3H_6O)_q-H$
$C_{16}H_{31}O-(CH_2CH_2O)_p-(C_3H_6O)_q-H$
$C_{16}H_{33}O-(CH_2CH_2O)_p-(C_3H_6O)_q-H$
$C_{18}H_{35}O-(CH_2CH_2O)_p-(C_3H_6O)_q-H$
$C_{18}H_{37}O-(CH_2CH_2O)_p-(C_3H_6O)_q-H$
$C_{12}H_{25}O-(CH_2CH_2O)_p-(C_3H_{60})_q-C_{12}H_{25}$
$C_{16}H_{31}O-(CH_2CH_2O)_p-(C_3H_{60})_q-C_{16}H_{31}$
$C_{16}H_{33}O-(CH_2CH_2O)_p-(C_3H_{60})_q-C_{12}H_{25}$
iso-$C_{13}H_{27}O-(CH_2CH_2O)_p-(C_3H_6O)_q-H$
$C_{10}H_{21}COO-(CH_2CH_2O)_p-(C_3H_6O)_q-H$
$C_{16}H_{33}COO-(CH_2CH_2O)_p-(C_3H_{60})_q-C_{12}H_{25}$ wherein p and q are the same as defined above.

Specific examples of the polyoxyalkylene group-containing emulsifier include a condensation product of ethylene oxide with hexylphenol, isooctylphenol, hexadecanol, oleic acid, alkane ($C_{12}$-$C_{16}$) thiol, sorbitan mono-fatty acid ($C_7$-$C_{19}$), or alkyl ($C_{12}$-$C_{18}$) amine.

The proportion of the polyoxyethylene block can be 5 to 80% by weight, for example, 30 to 75% by weight, particularly 40 to 70% by weight, based on the molecular weight of the polyoxyalkylene group-containing emulsifier (copolymer).

The average molecular weight of the polyoxyalkylene group-containing emulsifier is generally 300 to 5,000, for example, 500 to 3,000.

As the combination compound, (one or) two or more selected from blocked isocyanates, melamine, silicone, wax, an acetylene-based emulsifier, and a polyoxyalkylene group-containing emulsifier may be used. For example, a combination of at least one (particularly, one) selected from the blocked isocyanates with at least one (particularly, one or two) other compound selected from melamine, silicone, an acetylene-based emulsifier, and a polyoxyalkylene group-containing emulsifier may be used as the combination compound. The other compound(s) to be combined with the blocked isocyanate may be at least one selected from silicone, an acetylene-based emulsifier, and a polyoxyalkylene group-containing emulsifier. For example, as the other compound, a combination of silicone with an acetylene-based emulsifier or a polyoxyalkylene group-containing emulsifier may be used.

The amount of the combination compound may be 0.1 to 100 parts by weight, for example, 0.5 to 50 parts by weight, particularly 1 to 30 parts by weight, based on 100 parts by weight of the water-repellent polymer.

The amount of the blocked isocyanate is preferably 2 to 70 parts by weight or 5 to 50 parts by weight, more preferably 15 to 40 parts by weight, based on 100 parts by weight of the water-repellent polymer. The amount of the other compound(s) to be combined with the blocked isocyanate may be 1 to 200 weight, for example, 5 to 150 parts by weight, based on 100 parts by weight of the blocked isocyanate.

(3) Liquid Medium

The water-repellent composition comprises a liquid medium. The liquid medium is water, an organic solvent, or a mixture of water and an organic solvent.

The water-repellent composition is generally a solution or a dispersion. The solution is a solution of a polymer dissolved in an organic solvent. The dispersion is an aqueous dispersion of a polymer dispersed in an aqueous medium (water, or a mixture of water and an organic solvent).

Examples of the organic solvent include esters (e.g., esters having 2 to 30 carbon atoms, specifically ethyl acetate, butyl acetate), ketones (e.g., ketones having 2 to 30 carbon atoms, specifically methyl ethyl ketone, diisobutyl ketone), alcohols (e.g., alcohols having 1 to 30 carbon atoms, specifically isopropyl alcohol), aromatic solvents (e.g., toluene and xylene), and petroleum solvents (e.g., alkanes having 5 to 10 carbon atoms, specifically naphtha, kerosene).

The liquid medium may be water alone or a mixture of water and an (water-miscible) organic solvent. The amount of the organic solvent may be 30% by weight or less, for example, 10% by weight or less (preferably 0.1% by weight or more), based on the amount of the liquid medium. The liquid medium is preferably water alone.

The amount of the liquid medium may be 0.2 to 100 parts by weight, for example, 0.5 to 50 parts by weight, particularly 1 to 20 parts by weight, based on 1 part by weight in total of the water-repellent polymer and combination compound.

(4) Surfactant

When the water-repellent composition is in the form of an aqueous dispersion, the composition preferably contains a surfactant.

In the water-repellent composition, the surfactant includes a nonionic surfactant. Further, the surfactant preferably comprises at least one surfactant selected from a cationic surfactant, an anionic surfactant, and an amphoteric surfactant. A combination of a nonionic surfactant and a cationic surfactant is preferably used.

(4-1) Nonionic Surfactant

Examples of the nonionic surfactant include an ether, an ester, an ester ether, an alkanolamide, a polyhydric alcohol, and an amine oxide.

Examples of the ether include a compound having an oxyalkylene group (preferably a polyoxyethylene group).

Examples of the ester include an ester of an alcohol and a fatty acid. Examples of the alcohol include a monohydric to hexahydric (particularly dihydric to pentahydric) alcohol having 1 to 50 carbon atoms (particularly 10 to 30 carbon atoms) (e.g., aliphatic alcohol). Examples of the fatty acid include a saturated or unsaturated fatty acid having 2 to 50 carbon atoms, particularly 5 to 30 carbon atoms.

Examples of the ester ether include a compound obtained by adding an alkylene oxide (particularly, ethylene oxide) to an ester of an alcohol and a fatty acid. Examples of the alcohol include a monohydric to hexahydric (particularly dihydric to pentahydric) alcohol having 1 to 50 carbon atoms (particularly 3 to 30 carbon atoms) (e.g., aliphatic alcohol). Examples of the fatty acid include a saturated or unsaturated fatty acid having 2 to 50 carbon atoms, particularly 5 to 30 carbon atoms.

An exemplary alkanolamide is formed of a fatty acid and an alkanolamine. The alkanolamide may be a monoalkanolamide or dialkanolamino. Examples of the fatty acid include a saturated or unsaturated fatty acid having 2 to 50 carbon atoms, particularly 5 to 30 carbon atoms. Alkanolamine may be an alkanol having 1 to 3 amino groups and 1 to 5 hydroxyl groups and having 2 to 50, in particular, 5 to 30 carbon atoms.

The polyhydric alcohol may be a dihydric to pentahydric alcohol having 10 to 50 carbon atoms.

The amine oxide may be an oxide (having, for example, 5 to 50 carbon atoms) of an amine (secondary amine or preferably tertiary amine).

The nonionic surfactant is preferably a nonionic surfactant having an oxyalkylene group (preferably a polyoxyethylene group). The alkylene group in the oxyalkylene group preferably has 2 to 10 carbon atoms. Preferably, the number of oxyalkylene groups in a molecule of the nonionic surfactant is generally 2 to 100.

The nonionic surfactant is preferably a nonionic surfactant having an oxyalkylene group, selected from the group consisting of an ether, an ester, an ester ether, an alkanolamide, a polyhydric alcohol, and an amine oxide.

The nonionic surfactant may be a single type or a mixture of two or more.

(4-2) Cationic Surfactant

The cationic surfactant is preferably a compound having no amide group.

The cationic surfactant may be an amine salt, a quaternary ammonium salt, or an oxyethylene-added ammonium salt. Specific examples of the cationic surfactant include, but not limited to, amine salt surfactants such as an alkylamine salt, an amino alcohol fatty acid derivative, a polyamine fatty acid derivative, and imidazoline, and quaternary ammonium salt surfactants such as an alkyltrimethylammonium salt, a dialkyldimethylammonium salt, an alkyldimethylbenzylammonium salt, a pyridinium salt, an alkylisoquinolinium salt, and benzethonium chloride.

A preferable example of the cationic surfactant is a compound of:

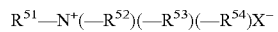

wherein $R^{51}$, $R^{52}$, $R^{53}$, and $R^{54}$ are each a hydrocarbon group having 1 to 30 carbon atoms, and X is an anionic group.

Specific examples of $R^{51}$, $R^{52}$, $R^{53}$, and $R^{54}$ include an alkyl group (e.g., a methyl group, a butyl group, a stearyl group, and a palmityl group). Specific examples of X include a halogen (e.g., chlorine) and an acid (e.g., hydrochloric acid and acetic acid).

The cationic surfactant is particularly preferably a monoalkyltrimethylammonium salt (wherein the alkyl has 4 to 30 carbon atoms).

The cationic surfactant is preferably an ammonium salt. The cationic surfactant may be an ammonium salt represented by the formula:

wherein $R^1$ is $C_{12}$ or more (e.g., $C_{12}$ to $C_{50}$) linear and/or branched aliphatic (saturated and/or unsaturated) group, $R^2$ is H or a $C_1$ to $C_4$ alkyl group, a benzyl group, a polyoxyethylene group, wherein the number of oxyethylene groups is, for example, 1 (particularly 2, especially 3) to 50), particularly preferably $CH_3$, $C_2H_5$, X is a halogen atom (e.g., chlorine) or a $C_1$ to $C_4$ fatty acid salt group, p is 1 or 2, q is 2 or 3, and p+q=4. $R^1$ may have 12 to 50, for example, 12 to 30 carbon atoms.

Specific examples of the cationic surfactant include dodecyltrimethylammonium acetate, trimethyltetradecylammonium chloride, hexadecyltrimethylammonium bromide, trimethyloctadecylammonium chloride, (dodecylmethylbenzyl)trimethylammonium chloride, benzyldodecyldimethyl ammonium chloride, methyldodecyldi(hydropolyoxyethylene)ammonium chloride, benzyldodecyldi (hydropolyoxyethylene)ammonium chloride, and N-[2-(diethylamino)ethyl]oleamide hydrochloride.

Examples of the amphoteric surfactant include alanines, imidazolinium betaines, amide betaines, and acetic acid betaine, and specific examples thereof include lauryl betaine, stearyl betaine, lauryl carboxymethyl hydroxyethyl imidazolinium betaine, lauryl dimethylaminoacetic acid betaine, and fatty acid amidopropyldimethylaminoacetic acid betaine.

Each of the nonionic surfactant, the cationic surfactant, and the amphoteric surfactant may be used alone or in combination of two or more.

The amount of the cationic surfactant may be 5% by weight or more, preferably 10% by weight or more, more preferably 20% by weight or more, based on the total amount of the surfactants. The weight ratio between the nonionic surfactant and the cationic surfactant is preferably 95:5 to 20:80, more preferably 85:15 to 40:60.

The amount of the cationic surfactant may be 0.05 to 10 parts by weight, for example, 0.1 to 8 parts by weight, based on 100 parts by weight of the polymer. The total amount of the surfactants may be 0.1 to 20 parts by weight, for example, 0.2 to 10 parts by weight, based on 100 parts by weight of the polymer.

(5) Additive

The water-repellent composition may contain an additive (5), in addition to the water-repellent polymer (1), combination agent (2) and the liquid medium (3) and, if necessary, the surfactant (4).

Examples of the additive (5) include another water-repellent agent, an oil-repellent agent, a drying rate adjuster, a cross-linking agents, a film formation agent, a compatibilizer, an antifreezing agent, a viscosity modifier, an ultraviolet absorber, an antioxidant, a pH adjusting agent, an antifoaming agent, a texture modifier, a slippage modifier, an antistatic agent, a hydrophilizing agent, an antibacterial agent, a preservative, an insect repellent, a fragrant agent, and a flame retarder.

The additive (5) may be a fluorine-containing polymer.

The water-repellent composition may contain the above-described water-repellent polymer (particularly, fluorine-free polymer) alone as a polymer (an active ingredient), but the composition may also contain a fluorine-containing polymer in addition to the above-described fluorine-free polymer. Generally, particles formed of the fluorine-free polymer and particles formed of the fluorine-containing polymer are present separately, in a water-repellent composition (particularly, an aqueous emulsion). In other words, it is preferable that the fluorine-free polymer and the fluorine-containing polymer be produced separately, and then the fluorine-free polymer and the fluorine-containing polymer be mixed. Generally, it is preferable that an emulsion (particularly, an aqueous emulsion) of a fluorine-free polymer and an emulsion (particularly, an aqueous emulsion) of a fluorine-containing polymer be produced separately, and then the emulsion of a fluorine-free polymer and the emulsion of a fluorine-containing polymer be mixed.

The fluorine-containing polymer has a repeating unit derived from a fluorine-containing monomer. The fluorine-containing monomer is preferably an acrylate ester or acrylamide represented by the general formula:

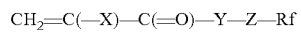

wherein X is a hydrogen atom, a linear or branched alkyl group having 1 to 21 carbon atoms, a fluorine atom, a chlorine atom, a bromine atom, an iodine atom, a $CFX^1X^2$ group (provided that $X^1$ and $X^2$ are each a hydrogen atom, a fluorine atom, a chlorine atom, a bromine atom, or an iodine atom), a cyano group, a linear or branched fluoroalkyl group having 1 to 21 carbon atoms, a substituted or non-substituted benzyl group, or a substituted or non-substituted phenyl group;

Y is —O— or —NH—;

Z is an aliphatic group having 1 to 10 carbon atoms, an aromatic group or a cycloaliphatic group having 6 to 18 carbon atoms, a —$CH_2CH_2N(R^1)SO_2$— group (provided that $R^1$ is an alkyl group having 1 to 4 carbon atoms), or a —$CH_2CH(OZ^1)CH_2$— group (provided that $Z^1$ is a hydrogen atom or an acetyl group), or a —$(CH^2)_m$—$SO_2$—$(CH^2)_n$— group or a —$(CH_2)_m$—S—$(CH_2)_n$— group (provided that m is 1 to 10, and n is 0 to 10); and $R_f$ is a linear or branched fluoroalkyl group having 1 to 20 carbon atoms.

The $R_f$ group has 1 to 6, particularly 4 to 6, especially 6 carbon atoms.

The fluorine-containing polymer may also have a repeating unit derived from at least one fluorine-free monomer selected from the group consisting of a halogenated olefin monomer, a fluorine-free non-crosslinkable monomer, and a fluorine-free crosslinkable monomer.

The halogenated olefin monomer is preferably an olefin having 2 to 20 carbon atoms which is substituted by 1 to 10 chlorine atoms, bromine atoms, or iodine atoms. Specific examples of the halogenated olefin monomer include halogenated vinyl such as vinyl chloride, vinyl bromide, and vinyl iodide, and halogenated vinylidene such as vinylidene chloride, vinylidene bromide, and vinylidene iodide.

A preferable fluorine-free non-crosslinkable monomer is a compound represented by the formula:

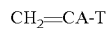

wherein A is a hydrogen atom, a methyl group, or a halogen atom other than a fluorine atom (e.g., a chlorine atom, a bromine atom, and an iodine atom), and T is a hydrogen atom, a chained or cyclic hydrocarbon group having 1 to 20 carbon atoms, or a chained or cyclic organic group having an ester bond and having 1 to 20 carbon atoms. Specific examples of the fluorine-free non-crosslinkable monomer include alkyl (meth)

acylate ester, ethylene, vinyl acetate, acrylonitrile, styrene, polyethylene glycol (meth)acrylate, polypropylene glycol (meth)acrylate, methoxypolyethylene glycol (meth)acrylate, methoxypolypropylene glycol (meth)acrylate, and vinyl alkyl ether.

The fluorine-free crosslinkable monomer may be a compound having at least two carbon-carbon double bonds (e.g., a (meth)acrylic group), or a compound having at least one carbon-carbon double bond and at least one reactive group.

A weight ratio of the fluorine-free polymer to the fluorine-containing polymer in the water-repellent composition may be 100:0 to 10:90, for example, 90:10 to 20:80, preferably 80:20 to 30:70.

Each of the fluorine-free polymer and the fluorine-containing polymer may be a single polymer, or may be a combination of two or more polymers.

When the fluorine-free polymer and the fluorine-containing polymer are used in combination, the properties (particularly, water-repellency) equal to or higher than those provided in the case where the fluorine-containing polymer alone is used.

The polymers (the polymer which does not have a fluoroalkyl group, particularly, the fluorine-free polymer, and the fluorine-containing polymer, particularly, the copolymer having a fluoroalkyl group) may be produced by any usual polymerization method, and conditions of polymerization reaction may be optionally selected. Such polymerization method includes a solution polymerization, a suspension polymerization, and an emulsion polymerization. The emulsion polymerization is preferable.

As long as the water-repellent composition is in the form of an aqueous emulsion, the method for producing the polymer is not limited. For example, the polymer is produced by the solution polymerization, and then the solvent is removed and a surfactant and water are added thereto to enable an aqueous emulsion to be provided.

For the solution polymerization, a method may be used in which a monomer is dissolved in an organic solvent in the presence of a polymerization initiator, followed by nitrogen purge, and then the solution is heated and stirred in the range of 30 to 120° C. for 1 to 10 hours. Examples of the polymerization initiator include azobisisobutyronitrile, benzoyl peroxide, di-t-butyl peroxide, lauryl peroxide, cumene hydroperoxide, t-butyl peroxypivalate, and diisopropyl peroxydicarbonate. The polymerization initiator is used in the range of 0.01 to 20 parts by weight, for example, 0.01 to 10 parts by weight, based on 100 parts by weight of the monomer.

The organic solvent is inert to monomers and dissolves them. Examples of the organic solvent may include an ester (e.g., an ester having 2 to 30 carbon atoms, specifically ethyl acetate and butyl acetate), a ketone (e.g., a ketone having 2 to 30 carbon atoms, specifically methyl ethyl ketone and diisobutyl ketone), and an alcohol (e.g., an alcohol having 1 to 30 carbon atoms, specifically isopropyl alcohol). Specific examples of the organic solvent include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichloroethylene, perchloroethylene, tetrachlorodifluoroethane, and trichlorotrifluoroethane. The organic solvent is used in the range of 10 to 2,000 parts by weight, for example, 50 to 1,000 parts by weight, based on 100 parts by weight of total of the monomer.

For the emulsion polymerization, a method may be used in which the monomer is emulsified in water in the presence of a polymerization initiator and an emulsifier, followed by nitrogen purge, and then the emulsion is stirred in the range of 50 to 80° C. for 1 to 10 hours to perform polymerization. Examples of the polymerization initiator to be used include a water-soluble polymerization initiator such as benzoyl peroxide, lauroyl peroxide, t-butyl perbenzoate, 1-hydroxycyclohexyl hydroperoxide, 3-carboxypropionyl peroxide, acetyl peroxide, azobisisobutylamidine-dihydrochloride, azobisisobutyronitrile, sodium peroxide, potassium persulfate, and ammonium persulfate, or an oil-soluble polymerization initiator such as azobisisobutyronitrile, benzoyl peroxide, di-t-butyl peroxide, lauryl peroxide, cumene hydroperoxide, t-butyl peroxypivalate, and diisopropyl peroxydicarbonate. The polymerization initiator is used in the range of 0.01 to 10 parts by weight, based on 100 parts by weight of the monomer.

To obtain a polymer-water dispersion liquid having excellent standing stability, it is desirable that an emulsification apparatus such as a high pressure homogenizer or an ultrasonic homogenizer which can impart a high crushing energy be used to micronize monomers in water and then the micronized monomers be polymerized. Further, various anionic, cationic, or nonionic emulsifiers may be used as an emulsifier, in the range of 0.5 to 20 parts by weight, based on 100 parts by weight of the monomer. An anionic and/or a nonionic and/or a cationic emulsifier is preferably used. When monomers are not completely compatibilized, a compatibilizer which allows these monomers to be sufficiently compatible, for example, a water-soluble organic solvent or a low molecular weight monomer, is preferably added. Addition of the compatibilizer can enhance emulsifiability and copolymerizability.

Examples of the water-soluble organic solvent include acetone, methyl ethyl ketone, ethyl acetate, propylene glycol, dipropylene glycol monomethyl ether, dipropylene glycol, tripropylene glycol, and ethanol. The solvent may be used in the range of 1 to 50 parts by weight, for example, 10 to 40 parts by weight, based on 100 parts by weight of water. Examples of the low molecular weight monomer include methyl methacrylate, glycidyl methacrylate, and 2,2,2-trifluoroethyl methacrylate. The low molecular weight monomer may be used in the range of 1 to 50 parts by weight, for example, 10 to 40 parts by weight, based on 100 parts by weight of total of the monomer.

A chain transfer agent may be used in polymerization. The molecular weight of the polymer can be changed in accordance with the amount to be used of the chain transfer agent. Examples of the chain transfer agent include a mercaptan group-containing compound such as lauryl mercaptan, thioglycol, and thioglycerol (particularly, an alkyl mercaptan (e.g., having 1 to 30 carbon atoms)), and inorganic salts such as sodium hypophosphite and sodium bisulfite. The chain transfer agent may be used in the range of 0.01 to 10 parts by weight, for example, 0.1 to 5 parts by weight, based on 100 parts by weight of total of the monomer.

The water-repellent composition may be in the form of a solution, an emulsion (particularly, an aqueous dispersion), or an aerosol, and a solution or an aqueous dispersion is preferred. The water-repellent composition comprises a polymer (an active ingredient of the water-repellent composition) and a medium (particularly, a liquid medium, for example, an organic solvent and/or water). The amount of the medium may be, for example, 5 to 99.9% by weight, particularly 10 to 80% by weight, based on the amount of the water-repellent composition.

In the water-repellent composition, the concentration of the polymer may be 0.01 to 95% by weight, for example, 5 to 50% by weight.

The water-repellent composition generally can be produced by mixing a water-repellent polymer mixture comprising a water-repellent polymer and a liquid medium with a combination agent formed of a combination compound or a combination agent comprising a combination compound and a liquid medium.

The water-repellent composition may be used as an external treatment agent (surface treatment agent) or an internal treatment agent. The water-repellent composition may be used as an oil-repellent agent, a soil resistant agent, a soil release agent, a release agent, or a mold release agent.

The water-repellent composition, when in the form of the external treatment agent, may be applied to an object to be treated by a conventionally known method. Usually, a method is employed in which the water-repellent composition is dispersed and diluted in an organic solvent or water, and the resultant is applied to the surface of the object to be treated by a known process such as dip coating, spray coating, or foam coating, and dried. Alternatively, if necessary, the composition may be applied together with a suitable cross-linking agent (e.g., a blocked isocyanate) and cured. Further, an insect repellent, a softening agent, an antibacterial agent, a flame retarder, an antistatic agent, a coating fixative, a wrinkle-resistant agent, or the like may be added to the water-repellent composition for use in combination. The concentration of the polymer in a treatment liquid to be brought into contact with the substrate may be 0.01 to 10% by weight (in the case of, particularly, dip coating), for example, 0.05 to 10% by weight.

Examples of the object to be treated with the treatment agent composition (the water-repellent composition) include textile products, stone materials, filters (e.g., electrostatic filters), dust masks, parts of fuel cells (e.g., gas diffusion electrodes and gas diffusion backings), glass, paper, wood, leather, fur, asbestos, bricks, cement, metal and oxide, ceramic products, plastic, coated surfaces, and plaster. Examples of the textile product include various items. Examples of the textile product include animal and plant natural fibers such as cotton, hemp, wool, and silk, synthetic fibers such as polyamide, polyester, polyvinyl alcohol, polyacrylonitrile, polyvinyl chloride, and polypropylene, semi-synthetic fibers such as rayon and acetate, inorganic fibers such as glass fiber, carbon fiber, and asbestos fiber, or a mixed fiber thereof.

Textile products may be in any form of fiber, fabric or the like.

The water-repellent composition may also be used as a soil resistant agent, a release agent, or a mold release agent (e.g., an internal mold release agent or an external mold release agent). The surface of a substrate, for example, can be easily released from another surface (another surface of the substrate, or surface of another substrate).

The polymer may be applied to a fibrous substrate (e.g., a textile product) by any known method for treating a textile product with liquid. When the textile product is a fabric, the fabric may be dipped in a solution, or a solution may be applied to or sprayed on the fabric. The textile product treated is dried and preferably heated at, for example, 100° C. to 200° C. for water-repellency to be exhibited.

Alternatively, the polymer may be applied to the textile product in a cleaning method. The polymer may be applied to the textile product, for example, during washing or in a dry cleaning method.

The textile product to be treated is typically a fabric, including a woven fabric, a knitted fabric, and a non-woven fabric, a fabric in the form of clothing, and a carpet. The textile product may also be a fiber, a yarn, or an intermediate textile product (e.g., a sliver or a roving). Materials of the textile product may be a natural fiber (e.g., cotton or wool), a chemical fiber (e.g., viscose rayon or lyocell), or a synthetic fiber (e.g., polyester, polyamide, or acrylic fiber), or may be a mixture of fibers (e.g., a mixture of the natural fiber and the synthetic fiber). The textile product is preferably a carpet.

Alternatively, the fibrous substrate may also be leather. To make the leather hydrophobic and lipophobic, an aqueous solution or an aqueous emulsion of the polymer may be applied to the leather at various stages of leather processing, for example, in the period of wetting processing of the leather or finishing of the leather.

Alternatively, the fibrous substrate may be paper. The polymer may be applied to paper which has been formed in advance, or may be applied to the paper at various stages of paper making, for example, in the period of drying of paper.

The "treatment" means application of the treatment agent to an object to be treated by, for example, dipping, spraying, or coating. The treatment allows the polymer, which is the active ingredient of the treatment agent, to penetrate into the inside of the object to be treated and/or to adhere to the surface of the object to be treated.

When the water-repellent composition is in the form of the internal treatment agent, the water-repellency can be given to a resin, for example a thermoplastic resin, by adding the composition to the resin. The water-repellent composition may be used when a molded article of the resin is produced.

The liquid medium is removed from a liquid (a solution or a dispersion) comprising the polymer to provide the polymer. For example, the dispersion of the polymer (an aqueous dispersion or a dispersion in an organic solvent) is subjected to re-precipitation with water or an organic solvent, and then the resultant is dried to enable the polymer to be provided.

A molded article can be produced by, for example, a method including a step of preparing a resin composition by mixing the resin and the polymer and a step of molding the resin composition. A molded article is preferably produced by melting and kneading using an extruder or the like.

In general, the thermoplastic resin and the polymer are compatible in a molten state. Kneading can be performed by a conventionally known method using, for example, a single screw extruder, a twin screw extruder, or a roll. The resin composition thus obtained is extruded, injection-molded, compression-molded, blow-molded, molded by a press, or the like. The resin composition is molded into molded articles of various shapes. The resulting molded article may be further heated in an oven, a drying furnace, or the like after molding processing. The molded article may have a single layer or multilayers of 2 to 10 layers, for example, 3 to 5 layers.

The molded article can be used for applications in which a thermoplastic resin is used, particularly, applications in which the resin preferably offers high convenience of wiping off stains and excellent scratch resistance. Examples of the application of the molded article include automobiles (exterior and interior parts) (e.g., bumpers, instrumental panels, door trims), household electric appliances (e.g., washing machines and refrigerators) (e.g., housings, doors, trays, and vegetable compartment containers in refrigerators), various cases, building materials (interior materials and parts) (e.g., handrails, wall papers, tables, chairs, toilet sheets and sheet covers, and bath tubs), electronic appliances (e.g., housings of smartphones), drainage ditches, pipes, tableware, floor materials, gasoline tanks, fuel hoses, and OA equipment. Among them, automobile interior parts, interior parts of household electric appliances, and building materials are further preferable.

EXAMPLES

Hereinafter, the present disclosure will be described in more detail with reference to Examples, but the present disclosure is not limited to these Examples.

Hereinafter, a part or % or a ratio represents a part by weight, % by weight, or a weight ratio, respectively, unless otherwise specified.

Test procedures are as follows.

Water-Repellency Test

A treatment liquid having a solid concentration of 1.5% was prepared, and a test fabric prepared by dipping a piece of fabric in the test solution, then putting the fabric through a mangle, and the heat-treating fabric was used to evaluate its water-repellency. The water-repellency of the treated fabric was evaluated, based on the spray method according to JIS-L-1092 (AATCC-22). The result is denoted by the water-repellency No. as shown in the following table. A higher score indicates better water-repellency.

| Water-repellency No. | State |
|---|---|
| 100 | No wetting or water droplets adhesion on surface |
| 90 | No wetting but small water droplets adhesion on surface |
| 80 | Wetting on separate small water droplets on surface |
| 70 | Wet on half of surface and separate small wet which penetrates fabric |
| 50 | Wet on whole surface |
| 0 | Wet on whole of front and back surfaces |

Water-Repellent Washing Durability

Washing was repeated 20 times in accordance with JIS L-0217103, and the water-repellency thereafter was evaluated (HL20).

Gum-Up Property

A polymer dispersion is prepared with water having a hardness of 16 such that the solid concentration reaches 1.8% to prepare 1,000 g of a diluted liquid. The liquid is placed in a pad of which the temperature can be controlled to 40° C. A polyester fabric having a width of 20 cm and a length of 80 cm and formed in a loop for continuous treatment is continuously treated through a mangle at a mangle pressure of 0.4 MPa for 1 hour. After 1 hour, the amount of solids attached to the mangle was observed visually and by touching with a hand to evaluate the gum-up property.

Good: No solid is attached
Fair: A few solids are attached
Bad: Many solids are attached.

The compounds used in Examples are as follows:

MDI-based blocked isocyanate: a compound obtained by blocking MDI (diphenylmethane diisocyanate) with methyl ethyl ketoxime TDI-based blocked isocyanate: a compound obtained by blocking TDI (tolylene diisocyanate) with methyl ethyl ketoxime HDI-based blocked isocyanate: a compound obtained by blocking HDI (hexamethylene diisocyanate) with 3,5-dimethylpyrazole Acetylene glycol: 2,4,7,9-tetramethyl-5-decyne-4,7-diol Polyoxyalkylene group-containing emulsifier: polyoxyethylene alkyl ether Production Example 1

A 500 ml plastic container was charged with 30 g of a water-soluble glycol-based solvent, 30 g of stearic acid amide ethyl acrylate, 50 g of stearyl acrylate, 180 g of pure water, 2 g of a cationic emulsifier, 2 g of a sorbitan fatty acid ester, and 6 g of a polyoxyethylene alkyl ether. The components were heated to 80° C., stirred with a homomixer at 2,000 rpm for 1 minute, and then ultrasonically emulsified and dispersed for 15 minutes. The emulsified dispersion was transferred into a 500 ml autoclave, followed by nitrogen purge, and then 0.2 g of lauryl mercaptan and 20 g of vinyl chloride were added. Further, 1 g of an azo group-containing water-soluble initiator was added, the resulting mixture was heated to 60° C., and reacted for 4 hours to provide an aqueous dispersion of a polymer. The dispersion was diluted with pure water to prepare an aqueous dispersion having a solid concentration of 30%.

Production Examples 2 to 4

Polymerization was performed according to the composition shown in Table 1 in the same manner as in Production Example 1, and the polymer thus obtained was then diluted with pure water to prepare an aqueous dispersion having a solid concentration of 30%.

Production Example 5

A 500 ml plastic container was charged with 17 g of a water-soluble glycol-based solvent, 21 g of stearic acid amide ethyl acrylate, 9 g of palmitic acid amide ethyl acrylate, 30 g of stearyl acrylate, 120 g of pure water, 0.6 g of a cationic emulsifier, 1 g of a sorbitan fatty acid ester, and 4.4 g of a polyoxyethylene alkyl ether. The components were heated to 80° C., stirred with a homomixer at 2,000 rpm for 1 minute, and then ultrasonically emulsified and dispersed for 15 minutes. The emulsified dispersion was transferred into a 500 cc four-necked flask equipped with a nitrogen introduction tube, a thermometer, a stirring rod, and a reflux tube, followed by nitrogen purge, and then 0.1 g of lauryl mercaptan was added. After stirring, 0.6 g of an azo group-containing water-soluble initiator was further added, and the resulting mixture was heated to 60° C. and reacted for 4 hours to provide an aqueous dispersion of a polymer. Thereafter, pure water was added to prepare a water dispersion having a solid concentration of 30%.

Production Example 6

A 200 mL four-necked flask was charged with 14 g of methyl hydrogen silicon oil (SiH:SiCH$_3$ molar ratio determined by 1H NMR=50:50) and 0.02 g of a hydrosilylation Pt catalyst. A stirring rod, a thermometer, and a reflux tube were installed thereon, and a dropping funnel was charged with 25 g of $CH_2=CH-(CH_2CH_2)_n-CH_2CH_3$ (n=7). $CH_2=CH-(CH_2CH_2)_n-CH_2CH_3$ (n=7) was added dropwise from the dropping funnel while the temperature was maintained at 70° C. After dropping was finished, the reaction was further continued at 70° C. for about 3 hours.

Disappearance of the peak of SiH was confirmed by infrared spectroscopy (IR), and silicone polymer A was thus provided.

Production Examples 7 to 9

Synthesis was performed according to the composition shown in Table 2 in the same manner as in Production Example 6. Disappearance of the peak of SiH was confirmed by infrared spectroscopy (IR), and silicone polymers B to D were thus provided.

Production Example 10

A 250 ml plastic container was charged with 28 g of silicone polymer A, 5.6 g of a water-soluble glycol-based solvent, 50 g of pure water, 1.7 g of a sorbitan fatty acid ester, 0.7 g of a polyoxyethylene alkyl ether, and 0.6 g of a cationic emulsifier. The components were heated to 75° C., stirred with a homomixer at 2,000 rpm for 1 minute and then ultrasonically emulsified and dispersed for 10 minutes. An aqueous dispersion was thus provided. Thereafter, pure water was added to prepare a water dispersion having a solid concentration of 30%.

Production Examples 11 to 13

A water dispersion was provided according to the composition shown in Table 3 in the same manner as in Production Example 10, and then was diluted with pure water to prepare an aqueous dispersion having a solid concentration of 30%.

Production Example 14

In a high pressure reaction vessel, 150 g of paraffin wax (melting point: 66° C., needle penetration: 12 (25° C.)) 350 g of pure water, 4.5 g of polyoxyethylene alkyl ether, and 3 g of a sorbitan fatty acid ester were placed and sealed. The components were heated to 110 to 120° C. with stirring and then emulsified at high pressure for 30 minutes to provide an aqueous dispersion. Further, the solid content was adjusted with pure water to 30%.

Production Example 15

An aqueous dispersion was provided in the same manner as in Production Example 14 except that 150 g of paraffin wax (melting point: 75° C., needle penetration: 6 (25° C.)) was used in a high pressure reaction vessel. Further, the solid content was adjusted with pure water to 30%.

Production Example 16

An aqueous dispersion was provided in the same manner as in Production Example 15 except that 150 g of paraffin wax (melting point: 82° C., needle penetration: 5 (25° C.)) was used in a high pressure reaction vessel. Further, the solid content was adjusted with pure water to 30%.

TABLE 1

|  | Prod. Ex. 1 | Prod. Ex. 2 | Prod. Ex. 3 | Prod. Ex. 4 | Prod. Ex. 5 |
| --- | --- | --- | --- | --- | --- |
| Stearic acid amide ethyl acrylate | 30 | 21 | 20 | 20 | 21 |
| Palmitic acid amide ethyl acrylate | — | 9 | 9 | 9 | 9 |
| Stearyl acrylate | 50 | 50 | 50 | 50 | 30 |
| Glycidyl methacrylate | — | — | 1 | — | — |
| Hydroxyethyl acrylate | — | — | — | 1 | — |
| Vinyl chloride | 20 | 20 | 20 | 20 | — |
| Azo group-containing water-soluble initiator | 1 | 1 | 1 | 1 | 0.6 |
| Lauryl mercaptan | 0.2 | 0.2 | 0.2 | 0.2 | 0.1 |
| Water-soluble glycol-based solvent | 30 | 30 | 30 | 30 | 17 |
| Cationic emulsifier | 2 | 2 | 2 | 2 | 0.6 |
| Sorbitan fatty acid ester | 2 | 2 | 2 | 2 | 1 |
| Polyoxyethylene alkyl ether | 6 | 6 | 6 | 6 | 4.4 |
| Pure water | 180 | 180 | 180 | 180 | 120 |

Numerals in table are in grams.

TABLE 2

| Composition of silicone polymer | | | | | |
| --- | --- | --- | --- | --- | --- |
|  | molar ratio SiH:SiCH$_3$ (1H NMR) | Prod. Ex. 6 | Prod. Ex. 7 | Prod. Ex. 8 | Prod. Ex. 9 |
| Methyl hydrogen silicon oil | 90:10 |  |  |  | 7.6 |
| Methyl hydrogen silicon oil | 60:40 |  | 12 |  |  |
| Methyl hydrogen silicon oil | 50:50 | 14 |  |  |  |
| Methyl hydrogen silicon oil | 30:70 |  |  | 17 |  |
| CH$_2$=CH—(CH$_2$CH$_2$), CH$_2$CH$_3$ (n = 14) |  |  |  |  | 45 |
| CH$_2$=CH—(CH$_2$CH$_2$)$_n$—CH$_2$CH$_3$ (n = 11) |  |  | 36 | 36 |  |
| CH$_2$=CH—(CH$_2$CH$_2$)$_n$—CH$_2$CH$_3$ (n = 7) |  | 25 |  |  |  |
| Hydrosilylation Pt catalyst |  | 0.02 | 0.02 | 0.02 | 0.02 |

Numerals in the table are in grams

TABLE 3

|  | Prod. Ex. 10 | Prod. Ex. 11 | Prod. Ex 12 | Prod. Ex. 13 |
| --- | --- | --- | --- | --- |
| Silicone polymer A | 28 |  |  |  |
| Silicone polymer B |  | 28 |  |  |
| Silicone polymer C |  |  | 28 |  |
| Silicone polymer D |  |  |  | 28 |
| Water-soluble glycol-based solvent | 5.6 | 5.6 | 5.6 | 5.6 |
| Cationic emulsifier | 0.6 | 0.6 | 0.6 | 0.6 |
| Sorbitan fatty acid ester | 1.7 | 1.7 | 1.7 | 1.7 |
| Polyoxyethylene alkyl ether | 0.7 | 0.7 | 0.7 | 0.7 |
| Pure water | 50 | 50 | 50 | 50 |

Example 1 (Test Example 1)

A test liquid (1,000 g) was prepared by diluting 50 g of the water dispersion having a solid concentration of 30% prepared in Production Example 2 and 5 g of the MDI-based blocked isocyanate (solid concentration: 20%) with tap water. A polyester fabric, a nylon fabric, and a cotton fabric were immersed in this test liquid and wrung with a mangle. The wet pickup was about 55% (polyester fabric), about 35% (nylon fabric), and about 55% (cotton fabric). The treated polyester fabric and the treated nylon fabric were dried and cured by passing through a pin tenter at 170° C. for 1 minute. The treated cotton fabric was dried and cured by passing through a pin tenter at 170° C. for 2 minutes.

The water-repellency of the test fabrics treated in this way was evaluated through a water-repellency test in accordance with the spray method of JIS L-1092. The results of the water-repellency are shown in Table 4.

Additionally, the evaluation results of the water-repellency of the test fabrics washed 20 times and then dried with a tumbler (at 60° C. for 30 minutes) in accordance with JIS L-0217103 are similarly shown in Table 4.

Examples 2 to 8 (Test Examples 2 to 8)

A test liquid (1,000 g) was prepared according to the formulation shown in Table 4 in the same manner as in Example 1 (Test Example 1). A polyester fabric, a nylon fabric, and a cotton fabric were immersed in this test liquid and wrung with a mangle. The wet pickup was about 55% (polyester fabric), about 35% (nylon fabric), and about 55% (cotton fabric). The treated polyester fabric and the treated nylon fabric were dried and cured by passing through a pin tenter at 170° C. for 1 minute. The treated cotton fabric was dried and cured by passing through a pin tenter at 170° C. for 2 minutes.

The water-repellency of the test fabrics treated in this way was evaluated through a water-repellency test in accordance with the spray method of JIS L-1092. The results of the water-repellency are shown in Table 4.

Additionally, the evaluation results of the water-repellency of the test fabrics washed 5 times or 20 times and then dried with a tumbler (at 60° C. for 30 minutes) in accordance with JIS L-0217103 are similarly shown in Table 4.

Example 9 (Test Example 9)

A test liquid (1,000 g) was prepared by diluting 50 g of the water dispersion having a solid concentration of 30% prepared in Production Example 2 and 0.5 g of acetylene group-containing glycol with tap water. A polyester fabric, a nylon fabric, and a cotton fabric were immersed in this test liquid and wrung with a mangle. The wet pickup was about 55% (polyester fabric), about 35% (nylon fabric), and about 55% (cotton fabric). The treated polyester fabric and the treated nylon fabric were dried and cured by passing through a pin tenter at 170° C. for 1 minute. The treated cotton fabric was dried and cured by passing through a pin tenter at 170° C. for 2 minutes.

The water-repellency of the test fabrics treated in this way was evaluated through a water-repellency test in accordance with the spray method of JIS L-1092. The results of the water-repellency are shown in Table 4.

Example 10 (Test Example 10)

A test liquid (1,000 g) was prepared by diluting 50 g of the water dispersion having a solid concentration of 30% prepared in Production Example 2 and 0.5 g of a polyoxyalkylene alkyl ether with tap water. A polyester fabric, a nylon fabric, and a cotton fabric were immersed in this test liquid and wrung with a mangle. The wet pickup was about 55% (polyester fabric), about 35% (nylon fabric), and about 55% (cotton fabric). The treated polyester fabric and the treated nylon fabric were dried and cured by passing through a pin tenter at 170° C. for 1 minute. The treated cotton fabric was dried and cured by passing through a pin tenter at 170° C. for 2 minutes.

The water-repellency of the test fabrics treated in this way was evaluated through a water-repellency test in accordance with the spray method of JIS L-1092. The results of the water-repellency are shown in Table 4.

Example 11 (Test Example 11)

A test liquid (1,000 g) was prepared by diluting 45 g of the water dispersion prepared in Production Example 2 and 5 g of the water dispersion prepared in Production Example 10 with tap water. A polyester fabric, a nylon fabric, and a cotton fabric were immersed in this test liquid and wrung with a mangle. The wet pickup was about 55% (polyester fabric), about 35% (nylon fabric), and about 55% (cotton fabric). The treated polyester fabric and the treated nylon fabric were dried and cured by passing through a pin tenter at 170° C. for 1 minute. The treated cotton fabric was dried and cured by passing through a pin tenter at 170° C. for 2 minutes.

The water-repellency of the test fabrics treated in this way was evaluated through a water-repellency test in accordance with the spray method of JIS L-1092. The results of the water-repellency are shown in Table 4.

Examples 12 to 19 (Test Examples 12 to 19)

A test liquid (1,000 g) was prepared according to the formulation shown in Table 4 in the same manner as in Example 11 (Test Example 11). A polyester fabric, a nylon fabric, and a cotton fabric were immersed in this test liquid and wrung with a mangle. The wet pickup was about 55% (polyester fabric), about 35% (nylon fabric), and about 55% (cotton fabric). The treated polyester fabric and the treated nylon fabric were dried and cured by passing through a pin tenter at 170° C. for 1 minute. The treated cotton fabric was dried and cured by passing through a pin tenter at 170° C. for 2 minutes.

The water-repellency of the test fabrics treated in this way was evaluated through a water-repellency test in accordance with the spray method of JIS L-1092. The results of the water-repellency are shown in Table 4.

Example 20 (Test Example 20)

A test liquid (1,000 g) was prepared by diluting 50 g of the water dispersion having a solid concentration of 30% prepared in Production Example 2, 5 g of the MDI-based blocked isocyanate (solid concentration: 20%), and 0.5 g of acetylene group-containing glycol with tap water. A polyester fabric, a nylon fabric, and a cotton fabric were immersed in this test liquid and wrung with a mangle. The wet pickup was about 55% (polyester fabric), about 35% (nylon fabric), and about 55% (cotton fabric). The treated polyester fabric and the treated nylon fabric were dried and cured by passing through a pin tenter at 170° C. for 1 minute. The treated cotton fabric was dried and cured by passing through a pin tenter at 170° C. for 2 minutes.

The water-repellency of the test fabrics treated in this way was evaluated through a water-repellency test in accordance with the spray method of JIS L-1092. The results of the water-repellency are shown in Table 4.

Additionally, the evaluation results of the water-repellency of the test fabrics washed 20 times and then dried with a tumbler (at 60° C. for 30 minutes) in accordance with JIS L-0217103 are similarly shown in Table 4.

Examples 21 to 24 (Test Examples 21 to 24)

A test liquid (1,000 g) was prepared according to the formulation shown in Table 4 in the same manner as in Example 20 (Test Example 20). A polyester fabric, a nylon fabric, and a cotton fabric were immersed in this test liquid and wrung with a mangle. The wet pickup was about 55% (polyester fabric), about 35% (nylon fabric), and about 55% (cotton fabric). The treated polyester fabric and the treated nylon fabric were dried and cured by passing through a pin tenter at 170° C. for 1 minute. The treated cotton fabric was dried and cured by passing through a pin tenter at 170° C. for 2 minutes.

The water-repellency of the test fabrics treated in this way was evaluated through a water-repellency test in accordance with the spray method of JIS L-1092. The results of the water-repellency are shown in Table 4.

Additionally, the evaluation results of the water-repellency of the test fabrics washed 20 times and then dried with a tumbler (at 60° C. for 30 minutes) in accordance with JIS L-0217103 are similarly shown in Table 4.

Comparative Example 1 (Comparative Test Example 1)

A test liquid (1,000 g) was prepared by diluting 50 g of the water dispersion having a solid concentration of 30% prepared in Production Example 1 with tap water. A polyester fabric, a nylon fabric, and a cotton fabric were immersed in this test liquid and wrung with a mangle. The wet pickup was about 55% (polyester fabric), about 35% (nylon fabric), and about 55% (cotton fabric). The treated polyester fabric and the treated nylon fabric were dried and cured by passing through a pin tenter at 170° C. for 1 minute. The treated cotton fabric was dried and cured by passing through a pin tenter at 170° C. for 2 minutes.

The water-repellency of the test fabrics treated in this way was evaluated through a water-repellency test in accordance with the spray method of JIS L-1092. The results of the water-repellency are shown in Table 4.

Additionally, the evaluation results of the water-repellency of the test fabrics washed 5 times or 20 times and then dried with a tumbler (at 60° C. for 30 minutes) in accordance with JIS L-0217103 are similarly shown in Table 4.

Comparative Examples 2 to 5 (Comparative Test Examples 2 to 5)

A test liquid (1,000 g) was prepared according to the formulation shown in Table 4 in the same manner as in Comparative Example 1 (Comparative Test Example 1). A polyester fabric, a nylon fabric, and a cotton fabric were immersed in this test liquid and wrung with a mangle. The wet pickup was about 55% (polyester fabric), about 35% (nylon fabric), and about 55% (cotton fabric). The treated polyester fabric and the treated nylon fabric were dried and cured by passing through a pin tenter at 170° C. for 1 minute. The treated cotton fabric was dried and cured by passing through a pin tenter at 170° C. for 2 minutes.

The water-repellency of the test fabrics treated in this way was evaluated through a water-repellency test in accordance with the spray method of JIS L-1092. The results of the water-repellency are shown in Table 4.

Additionally, the evaluation results of the water-repellency of the test fabrics washed 5 times or 20 times and then dried with a tumbler (at 60° C. for 30 minutes) in accordance with JIS L-0217103 are similarly shown in Table 4.

TABLE 4

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Formulation | Water-repellent dispersion | Prod. Ex. 1 | | | | | 50 | | | | | |
| | | Prod. Ex. 2 | 50 | 50 | 50 | 50 | | | | | 50 | 50 |
| | | Prod. Ex. 3 | | | | | | 50 | | | | |
| | | Prod. Ex. 4 | | | | | | | 50 | | | |
| | | Prod. Ex. 5 | | | | | | | | 50 | | |
| | Combination agent | MDI-based blocked isocyanate | 5 | | | | 5 | 5 | 5 | 5 | | |
| | | TDI-based blocked isocyanate | | 5 | | | | | | | | |
| | | HDI-based blocked isocyanate | | | 5 | | | | | | | |
| | | Melamine-based resin | | | | 5 | | | | | | |
| | | Acetylene glycol | | | | | | | | | 0.5 | |
| | | Polyoxyalkylene alkyl ether | | | | | | | | | | 0.5 |
| | | Prod. Ex. 10 | | | | | | | | | | |
| | | Prod. Ex. 11 | | | | | | | | | | |
| | | Prod. Ex. 12 | | | | | | | | | | |
| | | Prod. Ex. 13 | | | | | | | | | | |
| | | Prod. Ex. 14 | | | | | | | | | | |
| | | Prod. Ex. 15 | | | | | | | | | | |
| | | Prod. Ex. 16 | | | | | | | | | | |
| Evaluation | Water-repellency | Polyester Initial | 100 | 100 | 100 | 100 | 100 | 90-100 | 90-100 | 90-100 | 100 | 100 |
| | | HL20 | 90 | 80-90 | 80 | 80-90 | 90 | 90 | 90 | 70 | | |
| | | Nylon Initial | 100 | 100 | 100 | 100 | 100 | 90-100 | 90-100 | 90-100 | 100 | 90-100 |
| | | HL20 | 80 | 80 | 70-80 | 80 | 80 | 80 | 80 | 70 | | |

TABLE 4-continued

| | | Cotton | Initial HL20 | 80-90 70 | 80-90 70 | 80-90 70 | 80-90 70 | 80-90 70 | 80 70 | 80 70 | 80-90 50 | 80 | 80 |
|---|---|---|---|---|---|---|---|---|---|---|---|---|---|
| | | Gum-up property | | Fair | Fair | Fair | Fair | Fair | Fair | Fair | Fair | Good | Good |

| | | | | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|
| Formulation | Water-repellent dispersion | Prod. Ex. 1 | | | | | | | | | | |
| | | Prod. Ex. 2 | | 45 | 45 | 45 | 45 | 45 | 45 | 45 | | |
| | | Prod. Ex. 3 | | | | | | | | | | |
| | | Prod. Ex. 4 | | | | | | | | | | |
| | | Prod. Ex. 5 | | | | | | | | | 45 | 45 |
| Combination agent | MDI-based blocked isocyanate | | | | | | | | | | | |
| | TDI-based blocked isocyanate | | | | | | | | | | | |
| | HDI-based blocked isocyanate | | | | | | | | | | | |
| | Melamine-based resin | | | | | | | | | | | |
| | Acetylene glycol | | | | | | | | | | | |
| | Polyoxyalkylene alkyl ether | | | | | | | | | | | |
| | Prod. Ex. 10 | | | 5 | | | | | | | | |
| | Prod. Ex. 11 | | | | 5 | | | | | | 5 | |
| | Prod. Ex. 12 | | | | | 5 | | | | | | |
| | Prod. Ex. 13 | | | | | | 5 | | | | | |
| | Prod. Ex. 14 | | | | | | | 5 | | | | |
| | Prod. Ex. 15 | | | | | | | | 5 | | | 5 |
| | Prod. Ex. 16 | | | | | | | | | 5 | | |
| Evaluation | Water-repellency | Polyester | Initial HL20 | 100 | 100 | 100 | 100 | 100 | 100 | 100 | 100 | 100 |
| | | Nylon | Initial HL20 | 100 | 100 | 100 | 100 | 100 | 100 | 100 | 100 | 90-100 |
| | | Cotton | Initial HL20 | 90 | 90-100 | 90-100 | 90-100 | 80-90 | 90 | 90 | 90 | 80 |
| | | Gum-up property | | Good | Good | Good | Good | Fair | Fair | Fair | Good | Fair |

| | | | | Ex. 20 | Ex. 21 | Ex. 22 | Ex. 23 | Ex. 24 | Com. Ex. 1 | Com. Ex. 2 | Com. Ex. 3 | Com. Ex. 4 | Com. Ex. 5 |
|---|---|---|---|---|---|---|---|---|---|---|---|---|---|
| Formulation | Water-repellent dispersion | Prod. Ex. 1 | | | | | | 50 | | | | | |
| | | Prod. Ex. 2 | | 50 | 50 | 45 | 45 | 45 | | 50 | | | |
| | | Prod. Ex. 3 | | | | | | | | | 50 | | |
| | | Prod. Ex. 4 | | | | | | | | | | 50 | |
| | | Prod. Ex. 5 | | | | | | | | | | | 50 |
| Combination agent | MDI-based blocked isocyanate | | | 5 | 5 | 5 | 5 | 1.2 | | | | | |
| | TDI-based blocked isocyanate | | | | | | | 1.2 | | | | | |
| | HDI-based blocked isocyanate | | | | | | | 1.2 | | | | | |
| | Melamine-based resin | | | | | | | 1.2 | | | | | |
| | Acetylene glycol | | | 0.5 | | | | 0.25 | | | | | |
| | Polyoxyalkylene alkyl ether | | | | 0.5 | 0.5 | 0.5 | 0.25 | | | | | |
| | Prod. Ex. 10 | | | | | | | | | | | | |
| | Prod. Ex. 11 | | | | | 5 | | 2.5 | | | | | |
| | Prod. Ex. 12 | | | | | | | | | | | | |
| | Prod. Ex. 13 | | | | | | | | | | | | |
| | Prod. Ex. 14 | | | | | | | | | | | | |
| | Prod. Ex. 15 | | | | | | 5 | 2.5 | | | | | |
| | Prod. Ex. 16 | | | | | | | | | | | | |
| Evaluation | Water-repellency | Polyester | Initial HL20 | 100 90 | 100 90 | 100 90 | 100 90 | 100 90 | 100 80 | 100 80 | 90-100 70-80 | 90-100 70-80 | 90-100 50 |
| | | Nylon | Initial HL20 | 100 80 | 90-100 80 | 100 80 | 90-100 80 | 100 80 | 100 70-80 | 100 70-80 | 90-100 70-80 | 90-100 70-80 | 90-100 50 |
| | | Cotton | Initial HL20 | 80-90 70 | 80-90 70 | 90-100 70 | 90 70 | 90-100 70 | 80 50 | 80 50 | 70 50 | 70 50 | 80 0-50 |
| | | Gum-up property | | Good | Good | Good | Good/Fair | Good | Good | Good | Fair | Fair | Fair |

Numerals in tables are in grams.

INDUSTRIAL APPLICABILITY

The water-repellent composition may be used as an external treatment agent (surface treatment agent) or an internal treatment agent. The water-repellent composition can be suitably used for substrates such as textile products and masonry and imparts excellent water-repellency to the substrates.

What is claimed is:

1. A water-repellent composition comprising:
   (1) a polymer having 2 to 100% by weight, based on the amount of the polymer, of a repeating unit derived from
      (a) an amide group-containing monomer represented by the formula:

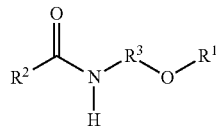

wherein $R^1$ is an organic residue having an ethylenically unsaturated polymerizable group,
$R^2$ is a hydrocarbon group having 7 to 30 carbon atoms, and
$R^3$ is a hydrocarbon group having 1 to 5 carbon atoms;
   (2) a combination agent comprising at least one combination compound selected from the group consisting of a blocked isocyanate compound, a melamine resin, a silicone polymer, and a wax; and
   (3) a liquid medium.

2. The water-repellent composition according to claim 1, wherein, in the monomer (a), $R^1$ is -C(=O) $CR^{11}$=$CH_2$, wherein $R^{11}$ is a hydrogen atom or a methyl group.

3. The water-repellent composition according to claim 1, wherein
   the polymer (1) further has a repeating unit derived from a polymerizable monomer other than the monomer (a), and
   the polymerizable monomer other than the monomer (a) is a compound represented by the formula:

$CH_2$=CA-T wherein A is a hydrogen atom, a methyl group, a chlorine atom, a bromine atom, or an iodine atom, and
   T is a hydrogen atom, a chlorine atom, a bromine atom, an iodine atom, a chained or cyclic hydrocarbon group having 1 to 40 carbon atoms, or a chained or cyclic organic group having an ester bond and having 2 to 41 carbon atoms.

4. The water-repellent composition according to claim 3, wherein
   the polymerizable monomer other than the monomer (a) is at least one selected from the group consisting of:
   (b) an acrylate ester monomer;
   (c) a fluorine-free crosslinkable monomer; and
   (d) a halogenated olefin monomer.

5. The water-repellent composition according to claim 4, wherein the acrylate ester monomer (b) is at least one selected from the group consisting of:
   (b1) an acrylate ester monomer having an aliphatic hydrocarbon group; and
   (b2) an acrylate ester monomer having a cyclic hydrocarbon group,
   the fluorine-free crosslinkable monomer (c) is a compound having at least two ethylenically unsaturated double bonds or a compound having at least one ethylenically unsaturated double bond and at least one reactive group, and
   the halogenated olefin monomer (d) is at least one selected from the group consisting of vinyl chloride and vinylidene chloride.

6. The water-repellent composition according to claim 4, wherein
   in the polymer, the amount of the repeating unit (b) is 0 to 200 parts by weight, the amount of the repeating unit (c) is 0 to 50 parts by weight, and the amount of the repeating unit (d) is 0 to 100 parts by weight, based on 100 parts by weight of the repeating unit (a).

7. The water-repellent composition according to claim 1, wherein
   in the combination agent (2),
   the blocked isocyanate compound is a compound having an isocyanate group moiety (a blocked isocyanate group) in which at least one isocyanate group is blocked with a blocking agent and having no polymerizable unsaturated group,
   the melamine resin is a polycondensate of melamine and aldehyde,
   the silicone polymer is a polymer represented by the formula:

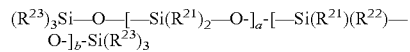

wherein each $R^{21}$ independently represents a hydrogen atom, an alkyl group having 1 to 20 carbon atoms, an aryl group having 6 to 20 carbon atoms, or an alkoxy group having 1 to 4 carbon atoms,
   each $R^{22}$ independently represents a saturated hydrocarbon group having 23 to 40 carbon atoms,
   each $R^{23}$ independently represents a hydrogen atom, an alkyl group having 1 to 20 carbon atoms, an aryl group having 6 to 20 carbon atoms, an alkoxy group having 1 to 4 carbon atoms, or a saturated hydrocarbon group having 23 to 40 carbon atoms,
   a represents an integer of 0 or more, b represents an integer of 1 or more, and (a+b) is 5 to 200, and
   in the wax, a compound constituting the wax has 20 to 60 carbon atoms.

8. The water-repellent composition according to claim 7, wherein
   the blocked isocyanate compound is a reaction product of an isocyanate represented by $A(NCO)_m$, wherein A is a group remaining after isocyanate groups are removed from a polyisocyanate, and m is an integer of 2 to 8, and a blocking agent represented by RH, wherein R is a hydrocarbon group optionally substituted by a hetero atom, and H is a hydrogen atom,
   the melamine resin is a partially or fully methylolated melamine resin obtained by a reaction between melamine and an aldehyde,
   the silicone polymer is a compound represented by the formula:

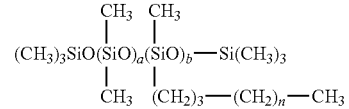

wherein a represents an integer of 0 to 150,
   b represents an integer of 1 to 150,
   (a+b) is 5 to 200, and n is an integer of 19 to 36, and
the wax is constituted by at least one compound selected from the group consisting of a normal alkane having 20 to 60 carbon atoms and a normal alkene having 20 to 60 carbon atoms.

9. The water-repellent composition according to claim 1, wherein the liquid medium (3) is water, an organic solvent, or a mixture of water and an organic solvent.

10. An object obtained by treating the surface of the object with the water-repellent composition according to claim 1.

11. A method for producing the water-repellent composition according to claim 1, comprising mixing a polymer mixture which comprises the polymer (1) and the liquid medium (3) with the combination agent (2) comprising a combination compound.

12. A method for treating a substrate, comprising treating a substrate with the water-repellent composition according to claim 1.

13. A method for producing a treated textile product, comprising treating a textile product with the water-repellent composition according to claim 1.

14. A resin composition comprising a resin and the water-repellent composition according to claim 1.

15. The water-repellent composition according to claim 1, wherein the polymer (1) is a polymer having no fluoroalkyl group.

* * * * *